United States Patent
Fukushima et al.

(10) Patent No.: US 7,351,184 B2
(45) Date of Patent: Apr. 1, 2008

(54) ENGINE CONTROL SYSTEM

(75) Inventors: Tomoki Fukushima, Wako (JP);
Yoshinori Maekawa, Wako (JP);
Hayato Matsuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 206 days.

(21) Appl. No.: 11/262,841

(22) Filed: Nov. 1, 2005

(65) Prior Publication Data

US 2006/0128521 A1 Jun. 15, 2006

(30) Foreign Application Priority Data

Nov. 5, 2004 (JP) .............................. 2004-322444
Nov. 10, 2004 (JP) .............................. 2004-326818

(51) Int. Cl.
*B60W 10/04* (2006.01)
*B60W 10/10* (2006.01)

(52) U.S. Cl. ....................................... 477/110; 477/115

(58) Field of Classification Search ................ 477/107, 477/110, 115, 121
See application file for complete search history.

(56) References Cited

U.S. PATENT DOCUMENTS 4,951,468 A * 8/1990 Sasajima et al. ............... 60/487

6,616,563 B2 * 9/2003 Inoue et al. ................. 475/198
7,085,645 B2 * 8/2006 Matsuda et al. ............. 701/110

FOREIGN PATENT DOCUMENTS

| JP | 62168737 A | * | 7/1987 |
| JP | 3-7555 | | 2/1991 |
| JP | 06-056398 | | 3/1994 |
| JP | 07-197829 | | 8/1995 |

* cited by examiner

*Primary Examiner*—Tisha Lewis
(74) *Attorney, Agent, or Firm*—Westerman, Hattori, Daniels & Adrian, LLP.

(57) ABSTRACT

In an engine control system mounted on a machine such as a walk-behind truck through a CVT and having an actuator whose operation is controlled such that a detected engine speed becomes equal to a desired engine speed, the output of the engine is estimated based on the detected engine speed and a detected throttle opening, the desired engine speed is changed when the estimated engine output is greater or smaller than output threshold values, and a speed reduction ratio of the CVT is also changed based on the detected engine speed such that a detected speed of the CVT output shaft speed becomes equal to a desired output shaft speed, thereby enabling to reduce the fuel consumption and noise of the engine.

22 Claims, 17 Drawing Sheets

ENGINE CONTROL SYSTEM

BACKGROUND OF THE INVENTION

1. Field of the Invention

This invention relates to an engine control system, particular to an internal combustion engine control system, more particularly to a control system for an internal combustion engine that is mounted on a machine such as a walk-behind truck and powers the machine.

2. Description of the Related Art

It is known to mount an internal combustion engine on a machine and power the machine using the engine output after it is lowered in rpm and increased in torque by a variable speed reducer. Japanese Laid-Open Patent Application No. Hei 6(1994)-56398, for example, teaches a cargo carrier equipped with a bed for loading cargo (freight), in which the output of the engine is passed through a variable speed reducer whose output of higher torque is used to drive the driven wheels, and in turn the crawler belts, of the cargo carrier, thereby enabling the cargo carrier to travel. The cargo carrier taught by this reference is of the walk-behind type, i.e., of the type the operator walks behind while operating.

This type of walk-behind truck is generally designed to be operated by an operator who walks behind the truck while manipulating an engine speed regulating lever to input an instruction to regulate engine speed and a vehicle speed regulating lever to input an instruction to regulate vehicle speed as desired.

When the engine speed (i.e., output) is too high or too low relative to the load acting on the crawler belts (for the uphill or downhill slope being traversed), the operator manipulates the engine speed regulating lever to adjust the engine speed to what is thought suitable based on experience. On the other hand, when the operator wants to drive the walk-behind truck at a certain speed, the operator uses the vehicle speed regulating lever to input the desired vehicle speed to a control system installed in the walk-behind truck. In response thereto, the control system regulates the engine speed and reduction ratio of the variable speed reducer so as to adjust the walk-behind truck speed to the desired speed.

Japanese Laid-Open Patent Application No. Hei 7(1995)-197829 teaches a generator driven by an internal combustion engine whose output is converted to high torque by a variable speed reducer. The generator of the second reference can be operated to generate alternating current of a predetermined frequency for a certain period of time by controlling the throttle opening of the engine so that the engine maintains a constant speed (rpm).

The speed of this type of generator is generally controlled to remain constant irrespective of the load acting on the generator, i.e., the magnitude of the load produced by outside equipment connected to the generator. This is undesirable from the viewpoint of engine noise and fuel consumption because the engine is maintained at the predetermined speed even when operating under relatively low load.

To overcome this disadvantage, Japanese Utility Model Publication Hei 3(1991)-7555 teaches a generator in which the engine speed is changed (increased/decreased) in accordance with load. There are also known inverter generators that vary the engine speed in accordance with load.

SUMMARY OF THE INVENTION

When a walk-behind truck equipped with a conventional engine system is driven, if the operator varies the engine speed in response to the load, which produces a corresponding change in the speed of the walk-behind truck that may cause cargo to fall off or be damaged. When changing the engine speed in response to load change, therefore, the operator is required to manipulate the vehicle speed regulating lever so as to keep the walk-behind truck at a constant travel speed. This complicates the operation of the walk-behind truck and tends to lower work efficiency.

Owing to the fact that the operator relies on experience when changing the engine speed in response to load change, instances of loud engine noise and poor fuel efficiency are liable to occur. Moreover, during high-speed driving of the walk-behind truck at a low engine speed, failure of the operator to properly regulate the engine speed at the time of an abrupt increase in load, such as at start of hill climbing, may cause the engine speed to fall to the point that the engine stalls.

When the engine speed is changed in response to load as in the generator taught by the second reference ('829), the rotational output applied to the input shaft of the generator changes to vary the voltage and frequency of the generator output, so that it is difficult to output a stable ac voltage of a predetermined frequency. Although output of a stable voltage irrespective of the engine operating state can be achieved by equipping the generator with an automatic voltage regulator (AVR), this does not solve the foregoing problems because, as pointed out above, the frequency of the generator output changes with changing engine speed.

In the case of an inverter generator, the minimum speed of the engine is limited owing to the constraint on the input voltage, so that room for improvement remains from the viewpoint of generator fuel consumption and noise.

An object of this invention is therefore to overcome the foregoing problems by providing an engine control system that reduces the fuel consumption and noise of an engine that is mounted on and powers a machine.

In order to achieve the object, this invention provides a system for controlling operation of an internal combustion engine connected to a machine through a variable speed reducer that reduces a speed of the engine to drive the machine, comprising: an actuator moving a throttle valve installed in an intake pipe of the engine; a crank angle sensor detecting the speed of the engine; an engine speed controller controlling operation of the actuator such that the detected engine speed becomes equal to a desired engine speed; a speed sensor detecting a speed of an output shaft of the variable speed reducer; a throttle position sensor detecting an opening of the throttle valve; an engine output estimator estimating an output of the engine based on the detected engine speed and the detected throttle opening; a desired engine speed changer changing the desired engine speed to a value in a speed-increasing direction when the estimated engine output is determined to be greater than a rising output threshold value; and a speed reduction ratio changer changing a speed reduction ratio of the variable speed reducer based on the detected engine speed such that the detected output shaft speed becomes equal to a desired output shaft speed.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

Preferred embodiments of the engine control system according to the present invention will now be explained with reference to the attached drawings.

Figure 1:
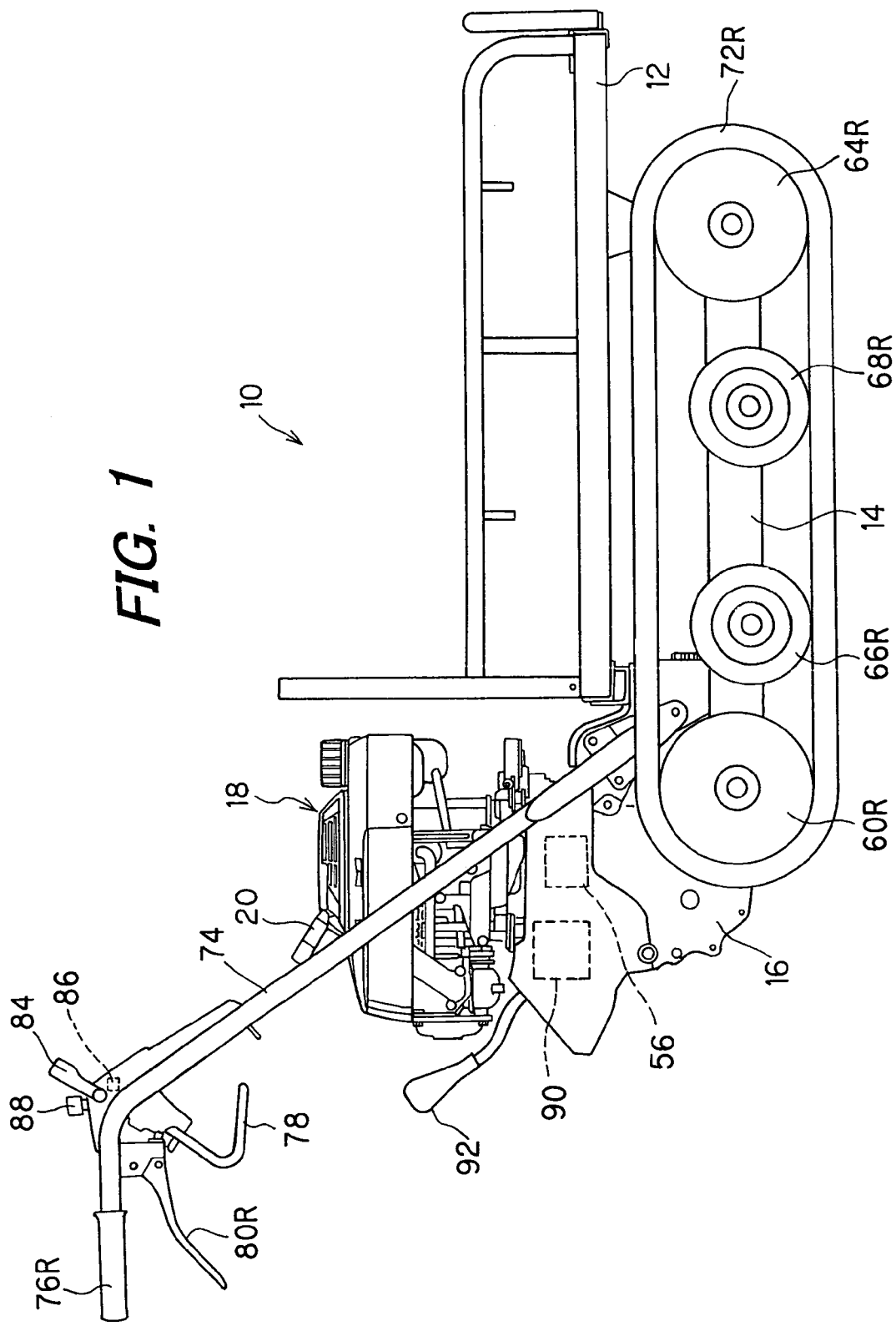
FIG. 1 is a side view of a walk-behind truck equipped with an engine control system according to a first embodiment of this invention.
Figure 2:
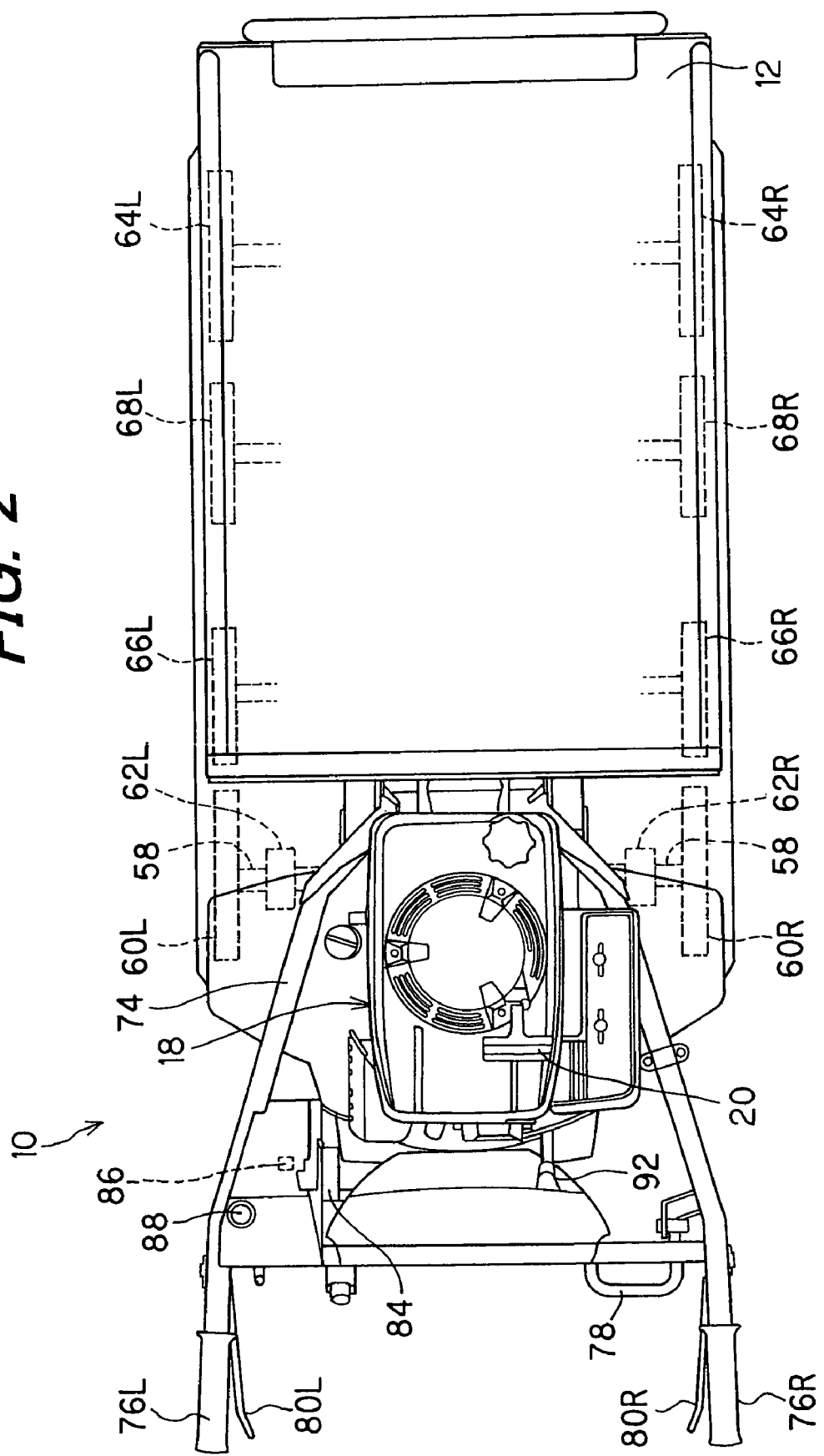
FIG. 2 is a plan view of the walk-behind truck shown in FIG. 1.

FIG. 1 is a side view of a walk-behind truck equipped with an engine control system according to a first embodiment of this invention. FIG. 2 is a plan view of the walk-behind truck shown in FIG. 1. Thus in this first embodiment, the machine equipped with and powered by an engine is a walk-behind truck.

The walk-behind truck is designated by the symbol 10 in FIGS. 1 and 2. The walk-behind truck 10 has a bed 12 for carrying cargo (none shown). The bed 12 is mounted on a front section of a frame 14 of the walk-behind truck 10. A variable speed reducer, more specifically a belt-type stepless speed drive, namely a continuously variable transmission (CVT) 16 to be explained below, is mounted on a rear section of the frame 14. An internal combustion engine 18 is mounted above the CVT 16. The operator starts the engine 18 manually by pulling the rope of its recoil starter 20.

Figure 3:
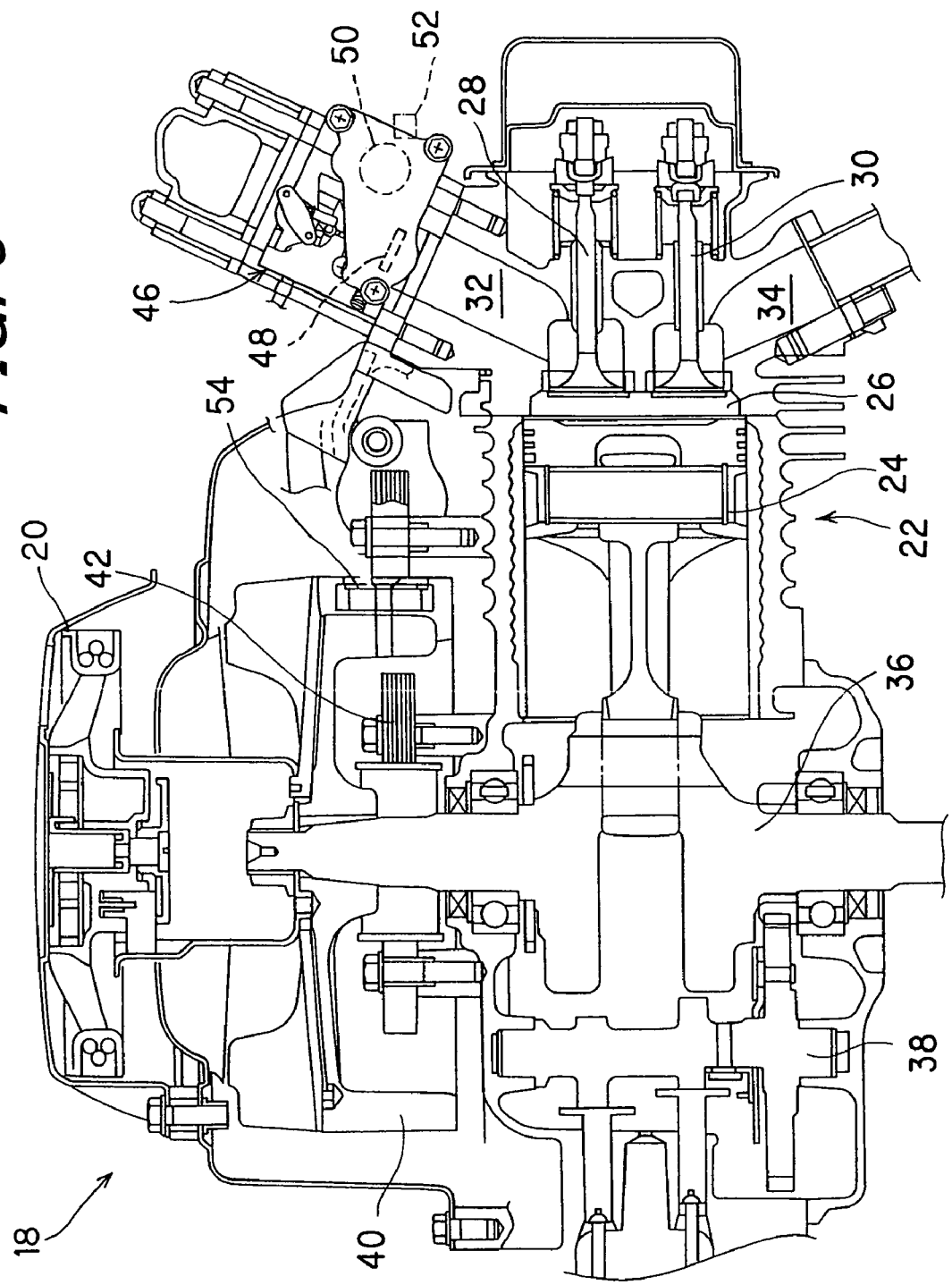
FIG. 3 is an explanatory sectional view of an internal combustion engine shown in FIG. 1.

FIG. 3 is an explanatory sectional view of the engine 18.

The engine 18 has a single cylinder 22 accommodating a piston 24 that reciprocates therein. A combustion chamber 26 of the engine 18 is provided with an intake valve 28 and an exhaust valve 30 for opening and closing communication of the combustion chamber 26 with an intake pipe 32 and an exhaust pipe 34. The engine 18 is an air-cooled, four-stroke, one-cylinder, OHV internal combustion gasoline engine with a displacement of 163 cc.

The piston 24 is connected to a crankshaft 36 that is connected to a camshaft 38 through a gear. A flywheel 40 is attached near one end of the crankshaft 36. The recoil starter 20 mentioned above is attached to the crankshaft 36 toward its distal end from the flywheel 40. The other end of the crankshaft 36 is connected through a drive clutch (explained later) to the input shaft of the CVT 16.

A magneto coil (alternator) 42 is installed inward of the flywheel 40 to rotate together with the flywheel and generate alternating current. The alternating current generated by the magneto coil 42 is converted to direct current by a processing circuit (not shown) and supplied as operating power to an ignition circuit (not shown) and so forth.

A throttle body 46 is installed at the upstream end of the intake pipe 32. The throttle body 46 accommodates a throttle valve 48 that is connected through a throttle shaft and reduction gearing (neither shown) to an electric motor (stepping motor serving as an actuator) 50 to be moved in the opening/closing direction. A carburetor assembly (not shown) is provided in the throttle body 46 on the upstream side of the throttle valve 48. The carburetor assembly is connected to a fuel tank (not shown) and produces an air-fuel mixture by injecting gasoline fuel into air drawn in at a rate regulated by the opening of the throttle valve 48. The produced air-fuel mixture is drawn into the combustion chamber 26 of the cylinder 22 through the throttle valve 48, intake pipe 32 and intake valve 28.

A throttle position sensor 52 installed near the motor 50 generates an output or signal corresponding to the opening θTH of the throttle valve 48 (hereinafter sometimes called the "throttle opening"). A crank angle sensor 54 constituted as a magnetic pickup is installed near the flywheel 40 to generate a pulse signal once every prescribed crank angle.

The explanation of FIGS. 1 and 2 will be resumed. As pointed out above, the crankshaft 36 (not shown in FIGS. 1 and 2) of the engine 18 is connected to the input shaft (not shown in FIGS. 1 and 2) of the CVT 16 through a drive clutch (main clutch) 56. The output shaft (not shown in FIGS. 1 and 2; explained below) of the CVT 16 is connected to left and right driven wheels 60L, 60R through a driveshaft 58 rotatably supported by the frame 14.

The driveshaft 58 is made up of segments interconnected through left and right side clutches 62L, 62R. The output of the engine 18 is thus transmitted to the driven wheels 60L, 60R through the drive clutch 56, CVT 16, driveshaft 58 and side clutches 62L, 62R.

Left and right non-driven (free) wheels 64L, 64R are mounted on the frame 14 forward of the driven wheels 60L, 60R. Pairs of left and right track wheels 66L, 68L and 66R, 68R are mounted on the frame 14 between the driven wheels 60L, 60R and free wheels 64L, 64R, respectively.

As shown in FIG. 1, a crawler belt 72R encircles the driven wheel 60R, free wheel 64R and track wheels 66R, 68R on the right side. Although not shown in FIG. 1, a crawler belt similarly encircles the driven wheel 60L, free wheel 64L and track wheels 66L, 68L on the left side. The walk-behind truck 10 can therefore be driven with the operator walking behind by transmitting the output of the engine 18 to the driven wheels 60L, 60R to rotate the left and right crawler belts.

As shown in FIGS. 1 and 2, a handlebar 74 is mounted at the rear of the frame 14. The handlebar 74 extends upward and rearward from the back of the walk-behind truck 10 and is formed at the upper end with left and right handle grips 76L, 76R to be gripped by the operator.

A drive clutch lever 78 is installed on the handlebar 74. The drive clutch lever 78 is connected to the drive clutch 56 through a cable (not shown). The operator can therefore engage and disengage the drive clutch 56 by manipulating the drive clutch lever 78.

Left and right turn levers 80L, 80R are installed on the handlebar 74. The left turn lever 80L is connected to the left side clutch 62L through a cable (not shown). The operator can therefore disengage the left side clutch 62L by operating the left turn lever 80L. The right turn lever 80R is connected to the right side clutch 62R through a cable (not shown). The operator can therefore disengage the right side clutch 62R by operating the right turn lever 80R.

When one or the other of the left and right side clutches 62L, 62R is disengaged, a difference in the rate of rotation occurs between the left and right driven wheels 60L, 60R. The walk-behind truck 10 therefore turns. Manipulation of the left lever 80L to disengage the left side clutch 62L makes the walk-behind truck 10 turn left. Manipulation of the right lever 80R to disengage the right side clutch 62R makes the walk-behind truck 10 turn right.

A truck speed regulation lever 84 is installed on the handlebar 74. The operator manipulates the truck speed regulation lever 84 to input the speed at which the operator wants the walk-behind truck to travel, i.e., the desired truck speed VD (such as high speed, medium speed or low speed). As termed in this specification, high speed, medium speed and low speed mean speeds of 7-10 km/h, 2-6 km/h and under 2 km/h, respectively.

A truck speed regulation lever sensor 86 is installed near the truck speed regulation lever 84. The speed regulation lever sensor 86 generates an output or signal corresponding to the position of the truck speed regulation lever 84 and thus representing the desired truck speed VD inputted by the operator.

An engine cutoff switch 88 is installed on the handlebar 74. When operated, the engine cutoff switch 88 generates an output or instruction indicating that the engine 18 is to be stopped.

An ECU (electronic control unit) 90 is installed near the engine 18. The ECU 90 comprises a microcomputer equipped with a CPU, ROM, RAM and a counter. It inputs the outputs of the various sensors.

A drive lever 92 is installed near the CVT 16. The drive lever 92, which is connected to a forward/reverse switching mechanism (explained below) of the CVT 16, is the equivalent of a shift lever for operating the CVT 16. It is operated by the operator to shift the operation of the CVT 16 among the forward, reverse and neutral positions.

The CVT 16 will now be explained.

Figure 4:
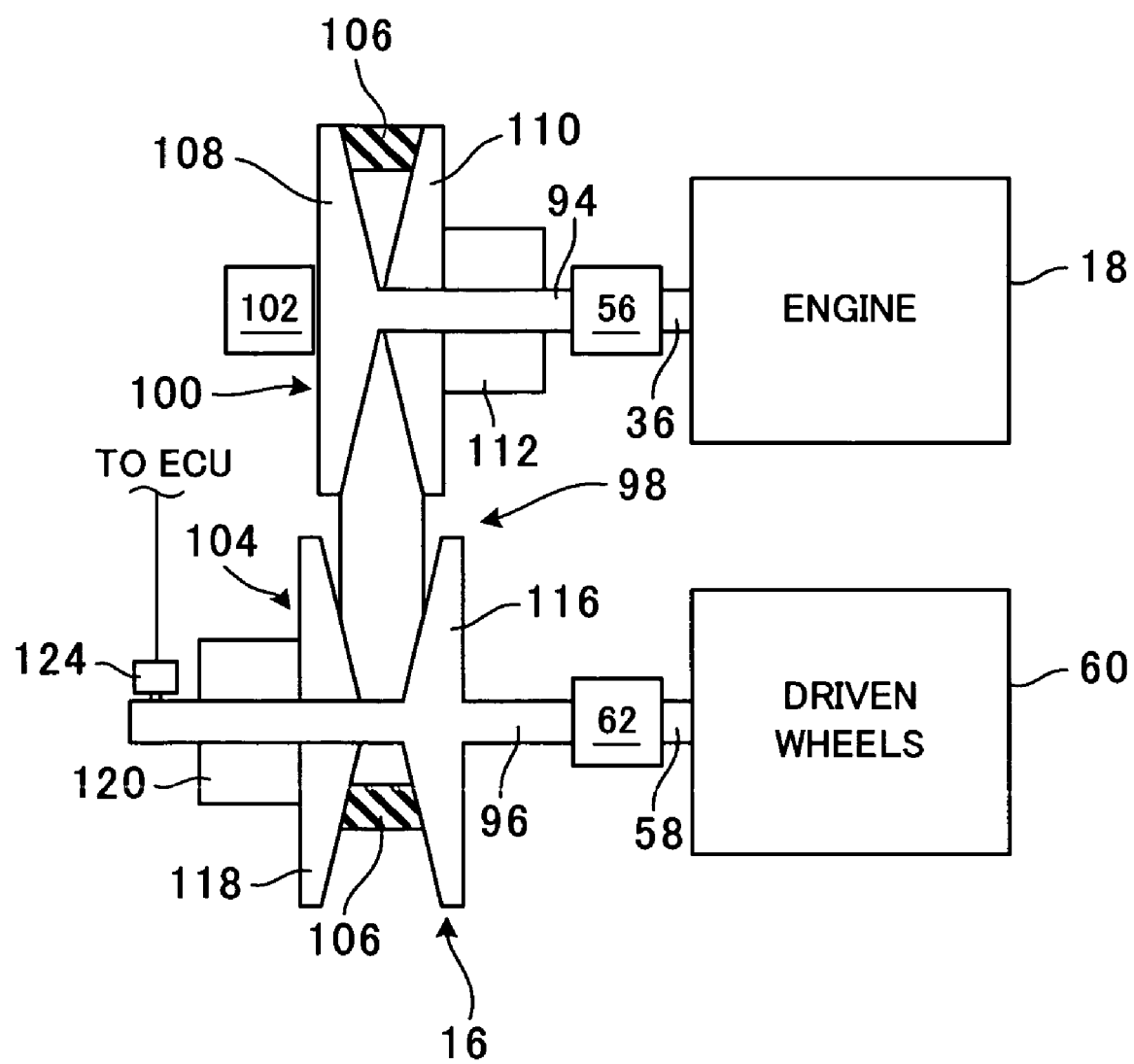
FIG. 4 is an explanatory view schematically showing the structure of a CVT shown in FIG. 1.

The structure of the CVT 16 is illustrated schematically in FIG. 4.

The CVT 16 comprises an input shaft 94 connected to the crankshaft 36 of the engine 18 through the drive clutch 56, an output shaft 96 connected to the driveshaft 58 of the driven wheels 60 through the side clutches 62, a V-belt mechanism 98 located between the input shaft 94 and output shaft 96, and a forward/reverse switching mechanism 102 connected to the input shaft 94 and a drive-side movable pulley 100.

The V-belt mechanism 98 comprises the drive-side movable pulley 100, a driven-side movable pulley 104 mounted on the output shaft 96 and a rubber V belt 106 looped around the two pulleys. The drive-side movable pulley 100 comprises a fixed pulley half 108 mounted on the input shaft 94 and a movable pulley half 110 capable moving axially relative to the fixed pulley half 108.

A hydraulic mechanism 112 comprising, among others, a hydraulic pump and a hydraulic path (neither shown) is connected to the side of the movable pulley half 110. The hydraulic mechanism 112 applies hydraulic pressure onto the movable pulley half 110 to produce pulley side pressure for moving the movable pulley half 110 axially.

The driven-side movable pulley 104 comprises a fixed pulley half 116 mounted on the output shaft 96 and a movable pulley half 118 capable moving axially relative to the fixed pulley half 116.

A hydraulic mechanism 120 comprising, among others, a hydraulic pump and a hydraulic path (neither shown) is connected to the side of the movable pulley half 118. The hydraulic mechanism 120 applies hydraulic pressure onto the movable pulley half 118 to produce pulley side pressure for moving the movable pulley half 118 axially.

The foregoing configuration of the V-belt mechanism 98 enables the operation of the hydraulic mechanisms 112, 120 to be controlled to apply or set suitable pulley side pressures to keep the V belt 106 from slipping. By this, the width of the movable pulleys 100, 104 can be changed to vary the loop radius of the V belt 106 to vary the speed reduction ratio (speed ratio) r continuously.

The forward/reverse switching mechanism 102 is equipped with a planetary gear mechanism (not shown) and the like, transmits the rotation of the input shaft 94 to the drive-side movable pulley 100, and is responsive to manipulation of the drive lever 92 by the operator for changing the direction of the rotation transmitted to the drive-side movable pulley 100 so as to switch the direction of travel of the walk-behind truck 10 between forward and reverse. When the drive lever 92 is moved to the neutral position, the transmission of power from the engine 18 to the drive-side movable pulley 100 is cut off to put the CVT 16 in neutral.

A speed sensor 124 is provided near the output shaft 96 of the CVT 16. The speed sensor 124 generates a pulse signal once every rotation of the output shaft 96.

Figure 5:
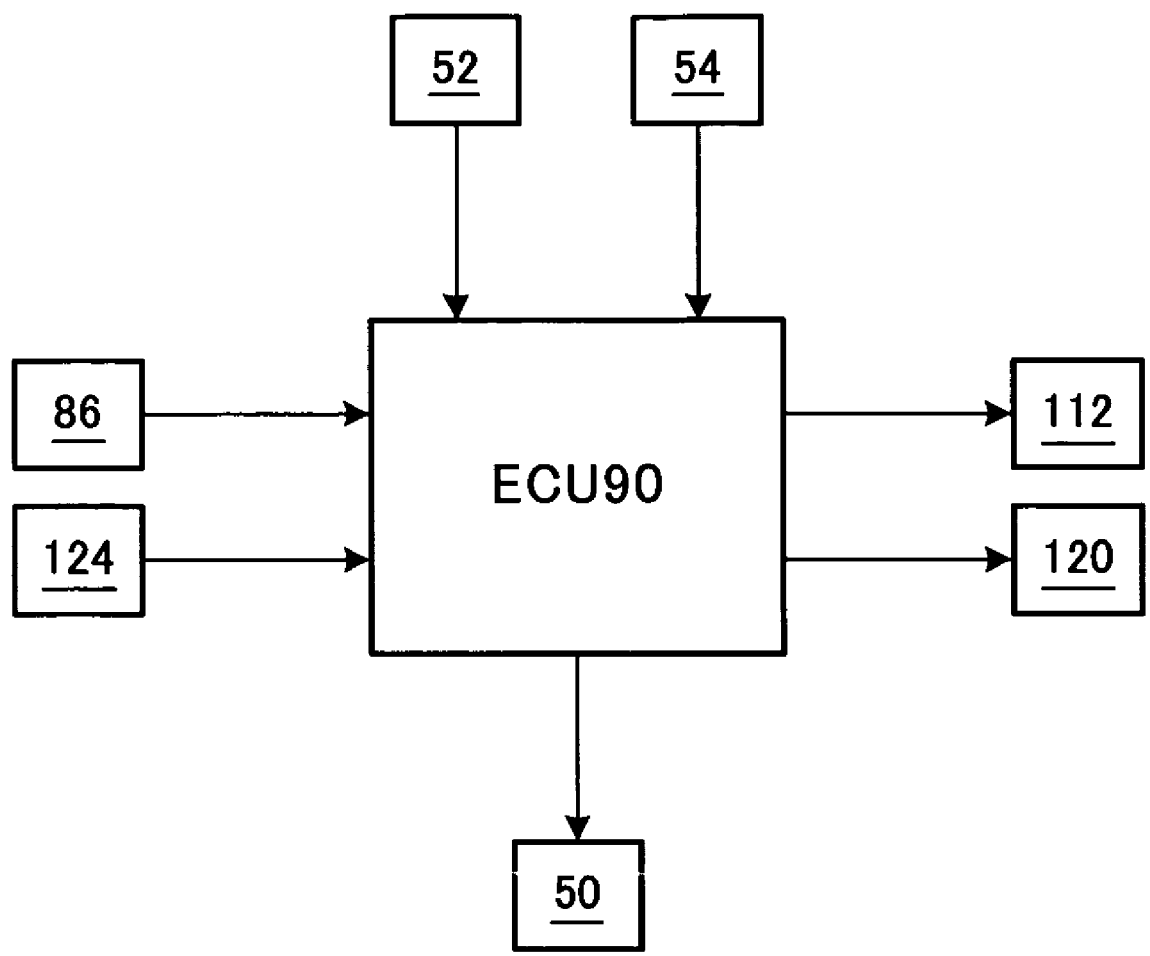
FIG. 5 is a block diagram schematically showing the operation of an ECU shown in FIG. 1.

FIG. 5 is a block diagram schematically illustrating the operation of the ECU 90.

As shown in FIG. 5, the outputs of the throttle position sensor 52, crank angle sensor 54, speed regulation lever sensor 86 and speed sensor 124 are sent to the ECU 90 as inputs. The outputs of the engine cutoff switch 88 and the like are also sent to the ECU 90 but are omitted from the drawing because they are not directly related to the substance of this invention.

The ECU 90 counts the output pulses of the crank angle sensor 54 to detect or calculate the engine speed NE. The ECU 90 calculates a current command value for the motor 50 so as to make the engine speed NE equal to a desired engine speed NED (explained below) based on the detected engine speed NE and throttle opening θTH and outputs the calculated current command value to the motor 50 to control the operation thereof.

The motor 50, the ECU 90, the sensors and the like thus constitute an electronic throttle system (electronic governor) that moves the throttle valve 48 so as to control the engine speed NE of the engine 18 to the desired engine speed NED. The ECU 90 further counts the output pulses from the speed sensor 124 to detect or calculate the output shaft speed NOUT.

In addition, the ECU 90 detects and outputs the desired output speed NOUTD of the CVT 16 based on the desired truck speed VD inputted via the speed regulation lever sensor 86. The desired truck speed VD can be calculated from the desired output speed NOUTD because the speed V of the walk-behind truck is proportional to the output shaft speed NOUT of the CVT.

The ECU 90 also calculates command values for the hydraulic mechanisms 112, 120 so as to make the output shaft speed NOUT equal to the desired output speed NOUTD based on the detected engine speed NE, namely, the input shaft speed NIN of the CVT 16 and outputs the calculated command values to the hydraulic mechanisms 112, 120 to control the operation thereof.

The hydraulic mechanisms 112, 120 and the ECU 90 thus apply or set the CVT 16 to an appropriate pulley side pressure for controlling the speed reduction ratio (speed ratio) r so as to make the output shaft speed NOUT equal to the desired output speed NOUTD.

The operation of the engine control system according to this embodiment, more specifically the processing procedures for setting the desired engine speed NED and the speed reduction ratio r of the CVT 16, will now be explained with reference FIGS. 6 to 10.

Figure 6:
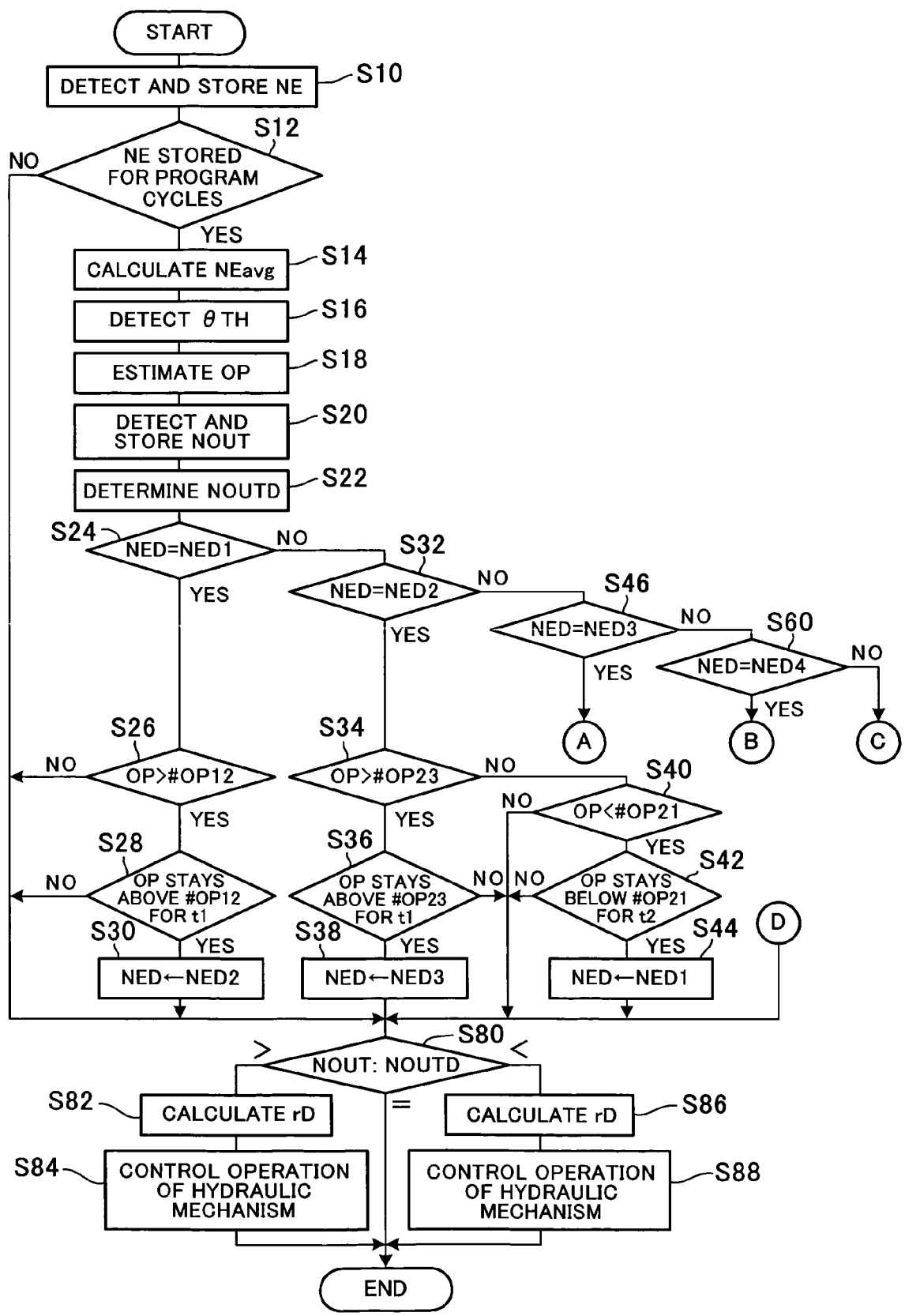
FIG. 6 is a partial flowchart showing the former half of the processing procedures of the engine control system according to the first embodiment.
Figure 7:
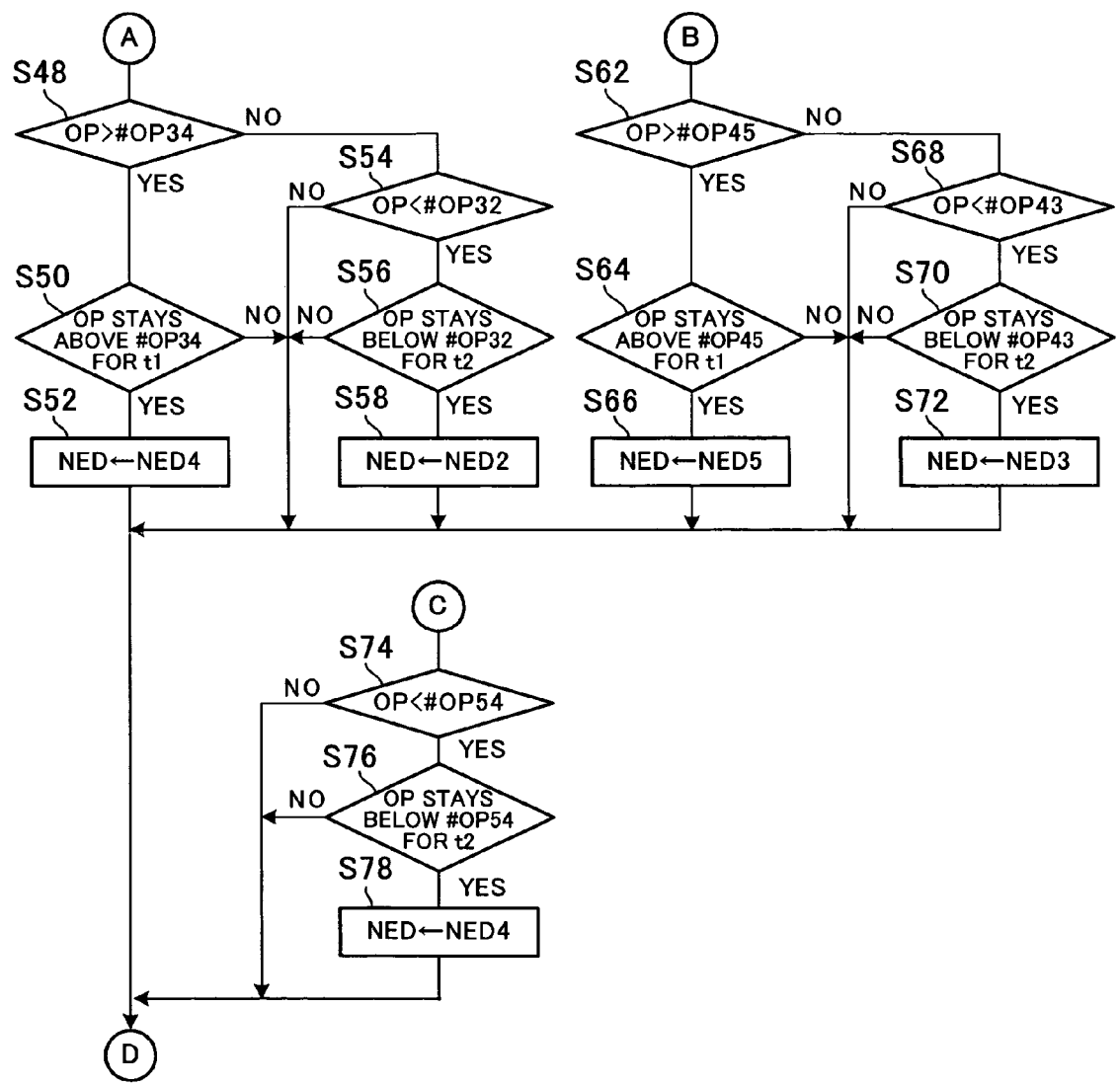
FIG. 7 is a partial flowchart showing the latter half of the flowchart shown in FIG. 6.

FIG. 6 is a partial flowchart showing the former half of the processing procedures and FIG. 7 is a partial flowchart showing the latter half. The illustrated program is executed in the ECU 90 once every predetermined time interval (e.g., 20 milliseconds).

First, in S10, the engine speed NE is detected or read and the detected engine speed NE is stored in the RAM of the ECU 90. Next, in S12, it is determined whether the detected values of the engine speed NE for a predetermined number of program cycles (e.g., 10 cycles of the program) have been stored. When the result in S12 is NO, the remaining processing steps (S14 to S78) are skipped. When it is YES, the program goes to S14, in which the average engine speed NEavg is calculated. The average engine speed NEavg is the average of the engine speeds NE stored during the predetermined number of cycles.

Next, in S16, the current value of the throttle opening θTH is detected or read, whereafter the output OP of the engine 18 is estimated or determined in S18. The engine output OP is a value or parameter indicating the engine load that is estimated from the average engine speed NEavg (roughly the engine speed NE) and the throttle opening θTH.

Figure 8:
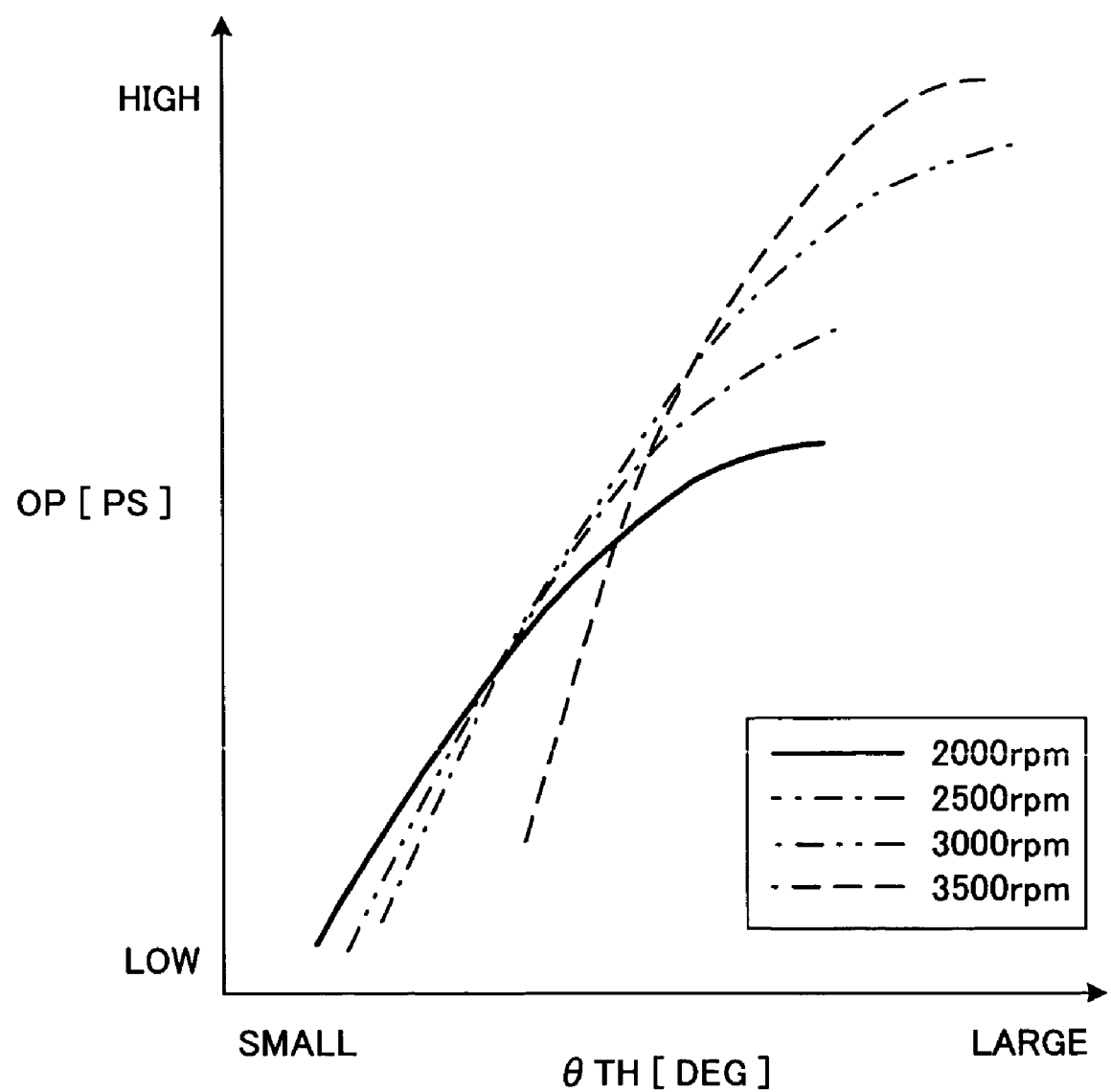
FIG. 8 is a graph showing the characteristics of an output speed with respect to throttle opening of the engine, which is used in the processing procedures shown in FIG. 6.

The estimation of the engine output OP will be explained more concretely. In this embodiment, the relationship between the throttle opening θTH and engine output OP is empirically predetermined for discrete sets of engine speeds beforehand as mapped data as shown in FIG. 8. Estimation of the engine output OP is performed by retrieval from the mapped data using the detected engine speed NE (more precisely, average engine speed NEavg) and the throttle opening θTH as address data.

When an increase in the load acting on the crawler belts 72L, 72R and the like (i.e., the load of the engine 18) causes a difference between the engine speed NE and desired engine speed NED, the ECU 90 maintains the desired engine speed NED by operating the motor 50 to regulate the throttle opening θTH (i.e., by regulating the engine output OP). Estimation of the engine output OP therefore amounts to estimation of the load acting on the crawler belts 72L, 72R and the like.

The explanation of the flowchart of FIG. 6 will be resumed. The program next goes to S20, in which the output shaft speed NOUT of the CVT 16 is detected or read and the detected output shaft speed NOUT is stored in the RAM of the ECU 90.

Next, in S22, the desired output speed NOUTD of the CVT 16 is detected or determined based on the desired truck speed VD inputted though the speed regulation lever sensor 86. In other words, the truck speed regulation lever 84 enables the operator to input the desired output shaft speed NOUTD.

Then, in S24, it is determined whether the desired engine speed NED of the engine 18 is set or determined at a first desired engine speed NED1. The first desired engine speed NED1 is the desired engine speed in the absence of load (when no load-producing work such as driving is in progress) or under very low load. In other words, it is the idling speed (e.g., 2,000 rpm). At activation of the ECU 90, the desired engine speed NED is set or determined at the first desired engine speed NED1, so the result in S24 is normally YES in the first program cycle.

When the result in S24 is YES, the program goes to S26, in which it is determined whether the estimated engine output OP is greater than a first rising output threshold value #OP12. This amounts to judging whether the load acting on the crawler belts 72 and the like is more than a very low load. The first rising output threshold value #OP12 is set at an output of about 38% of the wide-open output (output generation rate: 100%) when the engine speed NE is the first desired engine speed NED1. Specifically, it is set at 1.0 PS.

When the result in S26 is YES, the program goes to S28, in which it is determined whether the engine output OP stays above the first rising output threshold value #OP12 for a first predetermined time period t1. This determination is made by starting a counter (up-counter) in a separate program (not shown) when the result in S26 is YES and ascertaining whether the counter value has reached the first predetermined time period t1 (e.g., 1 sec).

Figure 9:
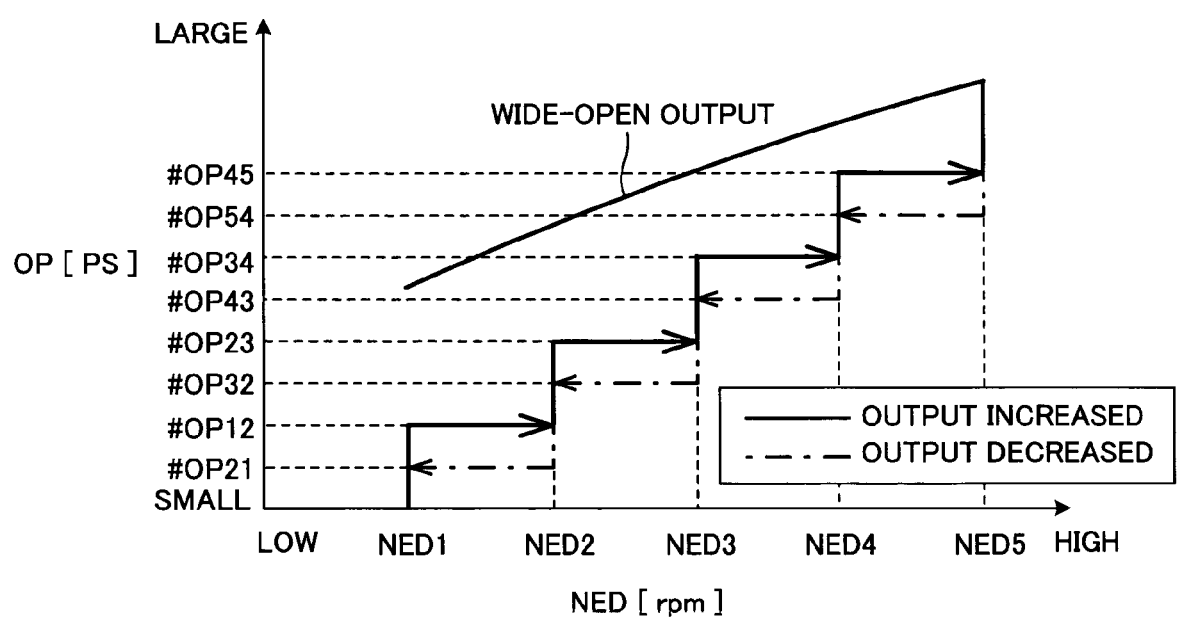
FIG. 9 is a graph showing the characteristics of an engine output with respect to a desired engine speed, which is used in the processing procedures shown in FIG. 6.

When the result in S28 is YES, the program goes to S30, in which, as shown by a bent solid arrow in FIG. 9, the desired engine speed NED is changed or raised to a second desired engine speed NED2 set or determined at a value in the speed-increasing direction from the first desired engine speed NED1. The second desired engine speed NED2 is a desired engine speed at a low load higher than the aforesaid very low load. It is set or determined at 2,500 rpm, for example. When the result in S26 is NO, S28 and S30 are skipped and when the result in S28 is NO, S30 is skipped. In either case, the first desired engine speed NED1 is maintained.

In the case where the desired engine speed NED is changed to the second desired engine speed NED2 in S30, the result in S24 in the next program cycle becomes NO and the program goes to S32, in which it is determined whether the desired engine speed NED is set or determined at the second desired engine speed NED2.

When the result in S32 is YES, the program goes to S34, in which it is determined whether the engine output OP is greater than a second rising output threshold value #OP23 set at a higher value than the first rising output threshold value #OP12. This amounts to judging whether the load acting on the crawler belts 72 is more than a low load. The second rising output threshold value #OP23 is set at an output of about 57% of the wide-open output when the engine speed NE is the second desired engine speed NED2. Specifically, it is set at 2.0 PS.

When the result in S34 is YES, the program goes to S36, in which, similarly to what was explained regarding S28, the value of a counter started when the result in S34 is YES is monitored to ascertain whether the engine output OP stays above the second rising output threshold value #OP23 for the first predetermined time period t1.

When the result in S36 is NO, S38 (discussed next) is skipped and the second desired engine speed NED2 is maintained. When the result in S36 is YES, the program goes to S38, in which, as shown by a bent solid arrow in FIG. 9, the desired engine speed NED is changed or raised to a third desired engine speed NED3 set or determined at a value in the speed-increasing direction from the second desired engine speed NED2. The third desired engine speed NED3 is a desired engine speed at a medium load higher than the aforesaid low load. It is set at 3,000 rpm, for example.

When the result in S34 is NO, the program goes to S40, in which it is determined whether the engine output OP is smaller than a first falling output threshold value #OP21. This amounts to determining whether the load acting on the crawler belts 72 is lower than the aforesaid low load. The first falling output threshold value #OP21 is set at a smaller value than the first rising output threshold value #OP12, namely, it is set at an output of about 15% of the wide-open output when the engine speed NE is the second desired engine speed NED2. Specifically, it is set at 0.5 PS.

When the result in S40 is YES, the program goes to S42, in which it is determined whether the engine output OP stays below the first falling output threshold value #OP21 for a second predetermined time period t2. This determination is made by starting a counter (up-counter) in a separate program (not shown) when the result in S40 is YES and ascertaining whether the counter value has reached the second predetermined time period t2 (e.g., 1 sec).

When the result in S42 is NO, S44 (discussed next) is skipped and the second desired engine speed NED2 is maintained. When the result in S42 is YES, the program goes to S44, in which, as shown by an alternate long and short dashed arrow in FIG. 9, the desired engine speed NED is changed or lowered to the first desired engine speed NED1 (a value in the speed-decreasing direction). When the result in S40 is NO, S42 and S44 are skipped and the second desired engine speed NED2 is maintained.

When the result in S32 is NO, the program goes to S46, in which it is determined whether the desired engine speed NED is set or determined at the third desired engine speed NED3. When the result in S46 is YES, the program proceeds through S48 to S58 of the flowchart of FIG. 7, in which processing similar to that in S34 to S44 is performed.

That is to say, in S48, it is determined whether the engine output OP is greater than a third rising output threshold value #OP34 set at a higher value than the second rising output threshold value #OP23. This amounts to judging whether the load acting on the crawler belts 72 is more than a medium load. The third rising output threshold value #OP34 is set at an output of about 72% of the wide-open output when the engine speed NE is the third desired engine speed NED3. Specifically, it is set at 3.0 PS.

When the result in S48 is YES, the program goes to S50, in which, similarly to what was explained regarding S28 and S36, the value of a counter started when the result in S48 is YES is checked to determine whether the first predetermined time period t1 has elapsed, i.e., whether engine output OP has remained above the third rising output threshold value #OP34 for the first predetermined time period t1.

When the result in S50 is NO, S52 (discussed next) is skipped and the third desired engine speed NED3 is maintained. When the result in S50 is YES, the program goes to S52, in which, as shown by a bent solid arrow in FIG. 9, the desired engine speed NED is changed or raised to a fourth desired engine speed NED4 set at a value in the speed-increasing direction from the third desired engine speed NED3. The fourth desired engine speed NED4 is a desired engine speed at a high load higher than the aforesaid medium load. In this embodiment it is set at 3,500 rpm.

When the result in S48 is NO, the program goes to S54, in which it is determined whether the engine output OP is smaller than a second falling output threshold value #OP32, i.e., whether the load acting on the crawler belts 72 is lower than the aforesaid medium load. The second falling output threshold value #OP32 is set at a smaller value than the second rising output threshold value #OP23, namely, it is set at an output of about 36% of the wide-open output when the engine speed NE is the third desired engine speed NED3. Specifically, it is set at 1.5 PS.

When the result in S54 is YES, the program goes to S56, in which it is determined whether the engine output OP stays below the second falling output threshold value #OP32 for the second predetermined time period t2. Similarly to what was explained regarding S42, this check is made by determining whether the value of a counter started when the result in S54 is YES has reached the second predetermined time period t2.

When the result in S56 is YES, the program goes to S58, in which, as shown by an alternate long and short dashed arrow in FIG. 9, the desired engine speed NED is changed or lowered to the second desired engine speed NED2 (value in the speed-decreasing direction). When the result in S54 is NO, S56 and S58 are skipped and when the result in S56 is NO, S58 is skipped. In either case, the third desired engine speed NED3 is maintained.

When the result in S46 of the flowchart of FIG. 6 is NO, the program goes to S60, in which it is determined whether the desired engine speed NED is set or determined at the fourth desired engine speed NED4. When the result in S60 is YES, the program proceeds through S62 to S72 of the flowchart of FIG. 7, in which processing similar to that in S34 to S44 and S48 to S58 is performed.

That is to say, in S62, it is determined whether the engine output OP is greater than a fourth rising output threshold value #OP45 set at a higher value than the third rising output threshold value #OP34, more specifically, whether it exceeds about 86% of the wide-open output when the engine speed NE is the fourth desired engine speed NED4 (86% of the wide-open output corresponding to about 4.0 PS). This amounts to determining whether load on the crawler belts 72 exceeds the aforesaid high load.

When the result in S62 is YES, the program goes to S64, in which it is determined whether the engine output OP stays above the fourth rising output threshold value #OP45 for the first predetermined time period t1. Similarly to what was explained early regarding S28, S36 and S50, this check is made by determining whether the value of a counter started when the result in S62 is YES has reached the first predetermined time period t1.

When the result in S64 is NO, S66 (discussed next) is skipped. As a result, the fourth desired engine speed NED4 is maintained. When the result in S64 is YES, the program goes to S66, in which, as shown by a bent solid arrow in FIG. 9, the desired engine speed NED is changed or raised to a fifth desired engine speed NED5 set or determined at a value in the speed-increasing direction from the fourth desired engine speed NED4. The fifth desired engine speed NED5 is a desired engine speed at a very high load higher than the aforesaid high load. In this embodiment it is set at 4,000 rpm, which is the maximum output rpm.

When the result in S62 is NO, the program goes to S68, in which it is determined whether the engine output OP is smaller than a third falling output threshold value #OP43, i.e., whether the load acting on the crawler belts 72 is lower than the aforesaid high load. The third falling output threshold value #OP43 is set at a smaller value than the third rising output threshold value #OP34, namely, it is set at an output of about 53% of the wide-open output when the engine speed NE is the fourth desired engine speed NED4. Specifically, it is set at 2.5 PS.

When the result in S68 is YES, the program goes to S70, in which, similarly to what was explained regarding S42 and S56, it is checked by monitoring a counter value whether the engine output OP stays below the third falling output threshold value #OP43 for the second predetermined time period t2.

When the result in S70 is NO, S72 is skipped (the fourth desired engine speed NED4 is maintained). When the result in S70 is YES, the program goes to S72, in which, as shown by an alternate long and short dashed arrow in FIG. 9, the desired engine speed NED is changed or lowered to the third desired engine speed NED3 (value in the speed-decreasing direction). When the result in S68 is NO, S70 and S72 are skipped and the fourth desired engine speed NED4 is maintained.

When the result in S60 is NO (i.e., when the desired engine speed NED is set at the fifth desired engine speed NED5), the program goes to S74 in the flowchart of FIG. 7, in which it is determined whether the engine output OP is smaller than a fourth falling output threshold value #OP54. This amounts to determining whether the load acting on the crawler belts 72 is lower than the aforesaid very high load. The fourth falling output threshold value #OP54 is set at a smaller value than the fourth rising output threshold value #OP45, namely, it is set at an output of about 75% of the wide-open output when the engine speed NE is the fourth desired engine speed NED4. Specifically, it is set at 3.5 PS.

When the result in S74 is YES, the program goes to S76, in which it is determined whether the engine output OP stays below the fourth falling output threshold value #OP54 for the second predetermined time period t2. This check is made in the same way as explained regarding S42, S56 and S70.

When the result in S76 is YES, the program goes to S78, in which, as shown by an alternate long and short dashed arrow in FIG. 9, the desired engine speed NED is changed or lowered to the fourth desired engine speed NED4 (value in the speed-decreasing direction). When the result in S74 is NO, S76 and S78 are skipped and when the result in S76 is NO, S78 is skipped. In either case, the fifth desired engine speed NED5 is maintained.

As pointed out in the foregoing, when the desired engine speed NED changes in response to the load acting on the crawler belts 72, the engine speed NE would ordinarily be expected to change to produce a change in the speed V of the walk-behind truck. However, the engine control system according to this first embodiment is configured to conduct the following processing steps for controlling the walk-behind truck to a constant truck speed V.

Namely, in S80 of the flowchart of FIG. 6, the detected output shaft speed NOUT and the desired output speed NOUTD are compared. In other words, the output shaft speed NOUT indicative of the current speed V of the walk-behind truck is compared with the desired output speed NOUTD indicative of speed VD desired by the operator.

When it is found in S80 that the output shaft speed NOUT is greater than the desired output speed NOUTD (e.g., when the value of the desired engine speed NED was changed in the increase direction in S30, S38, S52 or S66, thereby increasing the engine speed NE and thus increasing the output shaft speed NOUT), the program goes to S82, in which a desired speed reduction ratio rD of the CVT 16 is calculated.

Figure 10:
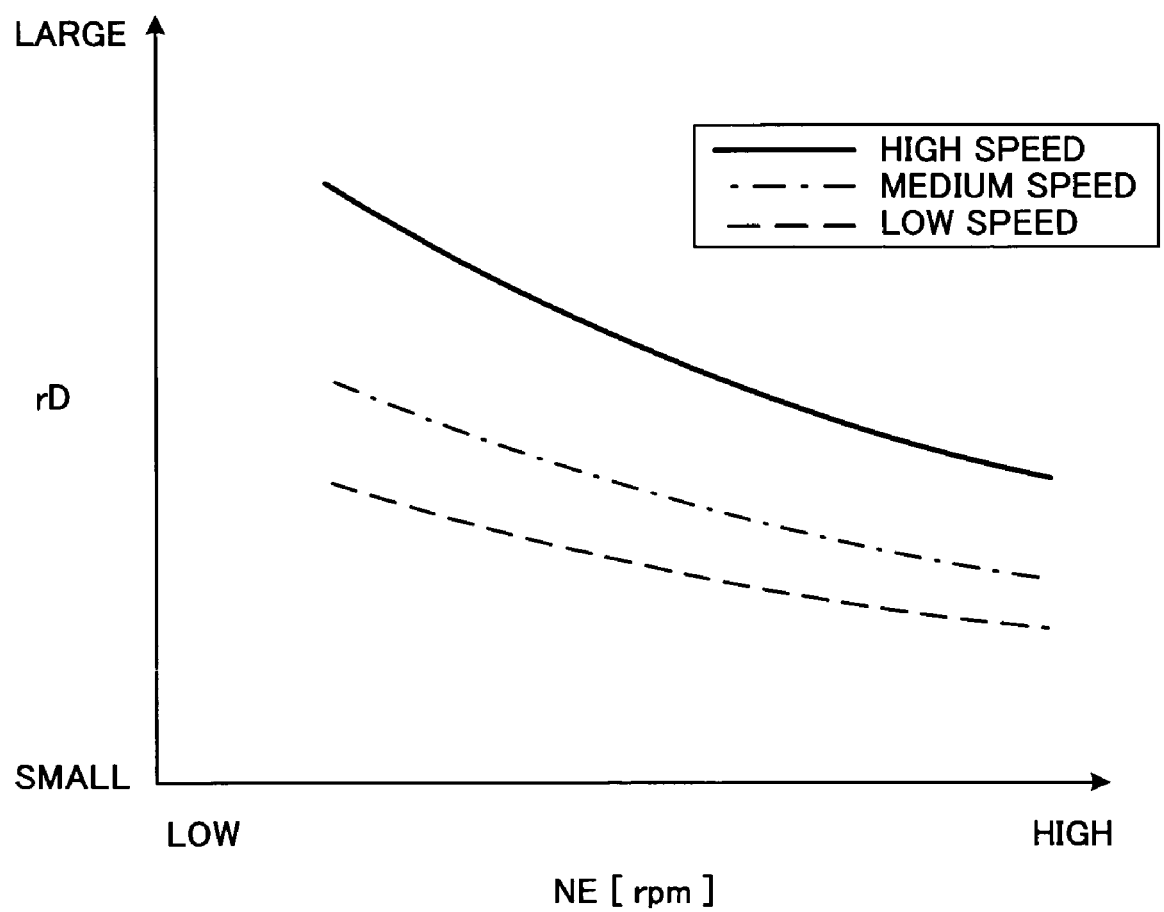
FIG. 10 is a graph showing the characteristics of a desired speed reduction ratio of the CVT with respect to the desired engine speed, which is used in the processing procedures shown in FIG. 6.

The calculation of the desired speed reduction ratio rD will be explained. The relationship between the engine speed NE and the desired speed reduction ratio rD is empirically determined for discrete desired truck speeds VD beforehand as mapped data as shown FIG. 10. In S82, the calculation or determination of the desired speed reduction ratio rD is performed by retrieval from the mapped data using the detected engine speed NE (more exactly, the average engine speed NEavg) and the desired truck speed VD as address data. In FIG. 10, three desired truck speeds VD, namely high speed, medium speed and low speed, are exemplified.

The explanation of the flowchart of FIG. 6 will be continued. Next, in S84, the operation of the hydraulic mechanisms 112, 120 is controlled to make or change the speed reduction ratio r of the CVT 16 equal to the calculated desired speed reduction ratio rD. Therefore, even if the engine speed NE should change (increase) in response to load, the output shaft speed NOUT is maintained at the desired output speed NOUTD owing to the change (reduction) of the speed reduction ratio r of the CVT 16 in this manner. In other words, the truck speed V is maintained at the desired truck speed VD.

On the other hand, when it is found in S80 that the output shaft speed NOUT is lower than the desired output speed NOUTD (e.g., when the value of the desired engine speed NED was changed in the decrease direction in S44, S58, S72 or S78, thereby decreasing the engine speed NE and thus decreasing the output shaft speed NOUT), the program goes to S86, in which a desired speed reduction ratio rD of the CVT 16 is calculated similarly to what was explained regarding S82.

Next, in S88, the operation of the hydraulic mechanisms 112, 120 is controlled to make or change the speed reduction ratio r of the CVT 16 equal to the calculated desired speed reduction ratio rD. Therefore, even if the engine speed NE should change (decrease) in response to load, the output shaft speed NOUT is maintained at the desired output speed NOUTD owing to the change (increase) of the speed reduction ratio r of the CVT 16 in this manner. In other words, the truck speed V is maintained at the desired truck speed VD.

When it is found in S80 that the output shaft speed NOUT is equal to the desired output speed NOUTD (e.g., when the value of the desired engine speed NED was not changed in S30, S44 or other such step), the speed reduction ratio r of the CVT 16 does not have to be changed. In this case, therefore, the current speed reduction ratio r is maintained and the program terminated.

As explained above, the engine control system according to the first embodiment of the invention is configured to change the value of the desired engine speed NED in the speed-increasing direction (i.e., to one of second to fifth desired engine speeds NED2, NED3, NED4, NED5) when engine output OP estimated based on the engine speed NE and throttle opening θTH exceeds a corresponding rising output threshold value (i.e., one of the first to fourth rising output threshold values #OP12, #OP23, #OP34, #OP45). Conversely, when the engine output OP stays below the rising output threshold value concerned, the value of the desired engine speed NED is not changed in the speed-increasing direction (the desired engine speed NED set at the lower value is maintained), so that the engine speed NE can be set at a low value when the engine output OP is small, thereby reducing fuel consumption and noise.

Moreover, the engine speed NE does not need to be regulated by use of an engine speed regulating lever or the like, so that that the walk-behind truck operation is simplified to improve operability and work efficiency.

Further, the engine speed NE is changed in response to the engine output (load) OP. Therefore, even if an abrupt increase in load (at the start of hill-climbing, for example) should be experienced during high-speed driving of the walk-behind truck at a low engine speed, the walk-behind truck 10 is prevented from stalling because the engine speed NE is increased in response to load.

In addition, the engine control system is configured to change the speed reduction ratio r of the CVT 16 based on the engine speed NE, i.e., change in the engine speed NE, so as to make the output shaft speed NOUT equal to the desired output speed NOUTD. The operator can therefore drive the walk-behind truck 10 constantly at a desired speed simply by inputting the speed (desired truck speed VD; desired output speed NOUTD). In other words, when the engine speed NE changes, e.g., when it changes owing to a change in engine output (load) OP during uphill or down hill travel, the speed of the walk-behind truck 10 is nevertheless maintained constant (at the desired truck speed VD) because the speed reduction ratio r is changed. The walk-behind truck operation is therefore simplified to improve operability and work efficiency still further.

Furthermore, the engine control system is configured to change the value of desired engine speed NED in the speed-decreasing direction (i.e., to one of first to fourth desired engine speeds NED1, NED2, NED3, NED4) when the estimated engine output OP is lower than a falling output threshold value set lower than the corresponding rising output threshold value (i.e., one of the first to fourth falling output threshold values #OP21, #OP32, #OP43, #OP54). As a result, the desired engine speed NED can be promptly reduced when the engine output (load) OP decreases, thereby more effectively lowering noise and improving fuel economy.

Moreover, the falling output threshold values are set at smaller values than the rising output threshold values. For example, the first falling output threshold value #OP21 is set at 0.5 PS, smaller than the value of 1.0 PS set for the first rising output threshold value #OP12. This prevents the desired engine speed NED from being frequently changed (i.e., avoids hunting).

Further, the engine control system is configured to change the value of the desired engine speed NED in the speed-increasing direction when the estimated engine output OP stays above a rising output threshold value for the first predetermined time period t1 and to change the desired engine speed NED in the speed-decreasing direction when the estimated engine output OP stays below a falling output threshold value for a second predetermined time period t2. This prevents the desired engine speed NED from being changed owing to momentary load fluctuations, thereby more effectively lowering noise and improving fuel economy.

In addition, the engine control system is configured to incorporate a plurality of rising output threshold values and falling output threshold values and change the selected rising output threshold value and falling output threshold value in response to a change in the desired engine speed NED. This enables the desired engine speed NED to be set at an appropriate value in accordance with the engine output (load) OP, thereby more effectively reducing fuel consumption and noise.

Further, the engine control system is configured to change the value of the desired engine speed NED in the upward direction to as far as the maximum output speed uses the detected engine speed NE, namely, the input shaft speed NIN of the CVT 16, to, i.e., the engine speed at which the engine 18 produces its highest output, specifically as far as the limit value of 4000 rpm. This enables the engine output to be brought up to maximum when the load developed (engine output OP) is maximum, thereby further improving working efficiency.

An engine control system according to a second embodiment of the present invention will now be explained.

Figure 11:
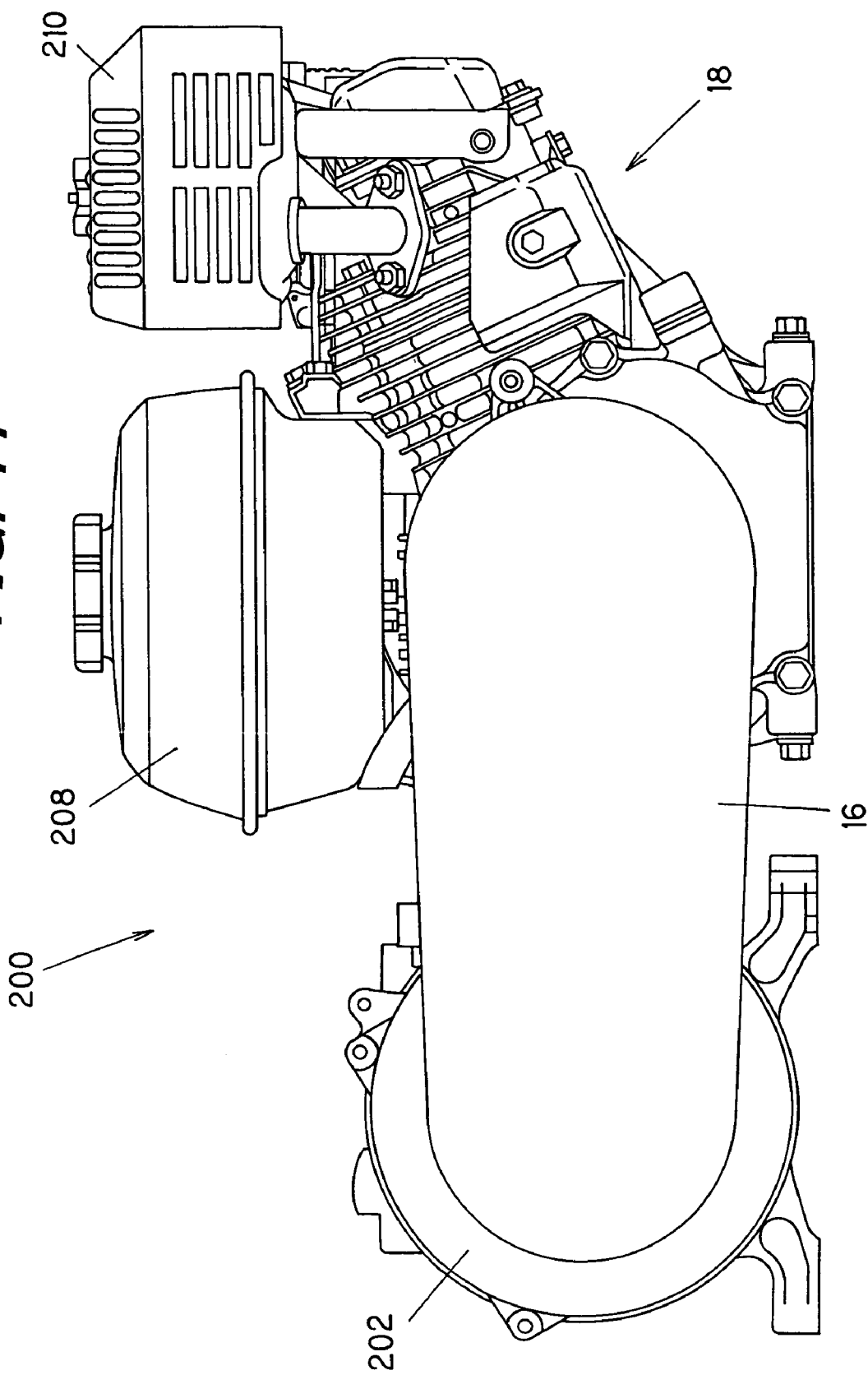
FIG. 11 is a side view of a generator equipped with an engine control system according to a second embodiment of this invention.
Figure 12:
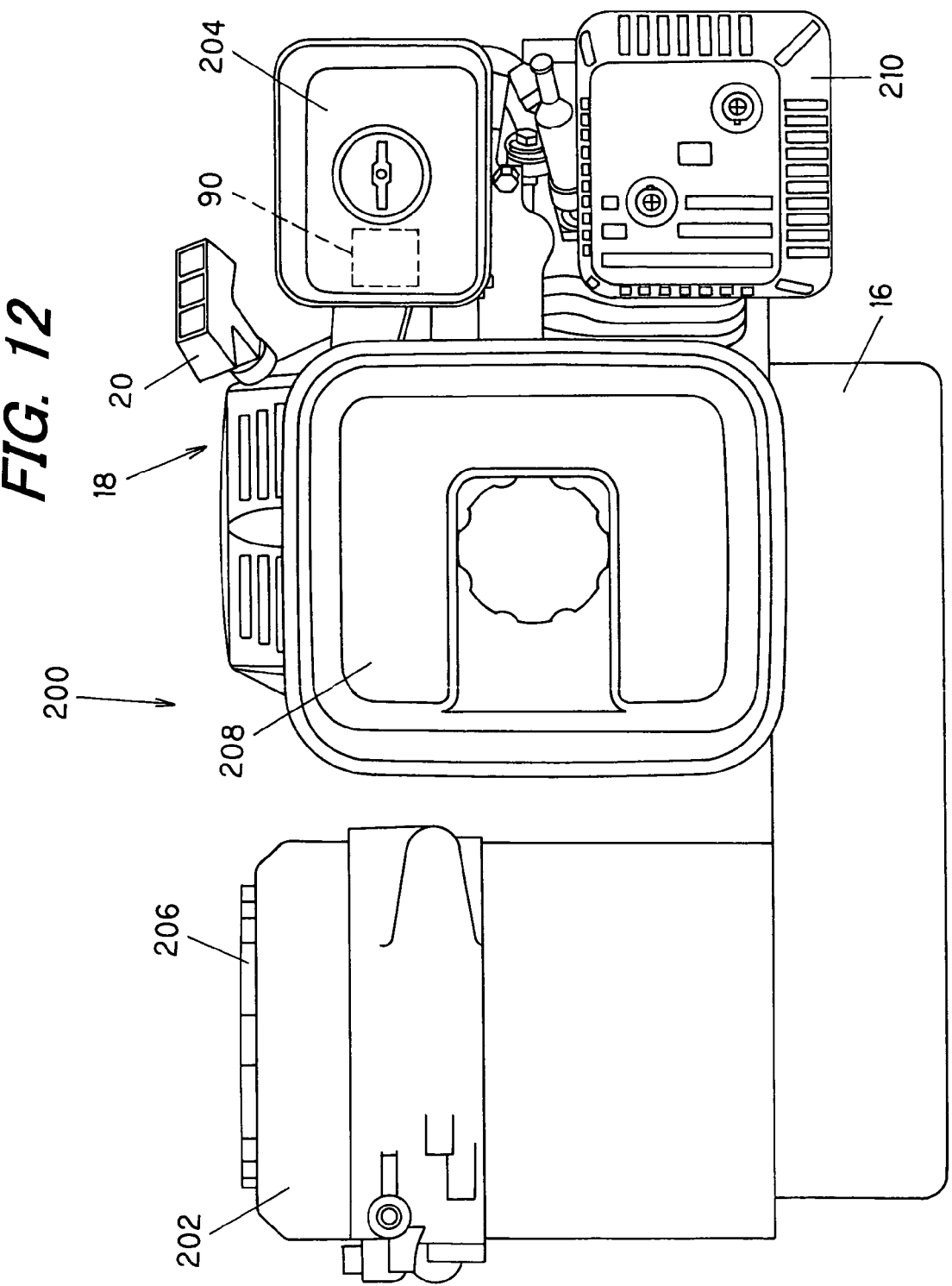
FIG. 12 is a plan view of the generator shown in FIG. 11.

FIG. 11 is a side view of a generator equipped with an engine control system according to the second embodiment of this invention. FIG. 12 is a plan view of the generator shown in FIG. 11. Thus in this second embodiment, the machine equipped with and powered by the engine 18 is a generator instead of a walk-behind truck.

The generator is designated by the symbol 200 in FIGS. 11 and 12. The generator 200 is equipped with an alternator 202 connected to the CVT 16 and driven by the output of the engine 18 after it has been lowered in speed and increased in torque by the CVT 16. In this second embodiment, the engine 18 is mounted at an angle on the generator 200. A throttle body cover 204 (not visible in FIG. 11) is installed on top of the engine 18 and a throttle body (not shown) and the ECU 90 and the like are installed in the space under the cover. The structure of the engine 18 is the same as that described with reference to the first embodiment.

The alternator 202 is driven by the rotation (output) of the engine 18 transmitted through the CVT 16 to produce alternating current and is equipped with the aforementioned AVR (automatic voltage regulator). It is a conventional ac generator comprising a rotor and stator (neither shown) and therefore will not be explained in detail.

Part of the alternating current generated by the alternator 202 is converted to direct current by a processing circuit (not shown) and supplied as operating power to the ECU 90, an ignition circuit (not shown) and so forth. The remainder is passed through an inverter (not shown) to be shaped in to a stable sine wave of 50 Hz or 60 Hz and then supplied to external equipment through a socket (not shown).

An operator panel 206 (see FIG. 12) is mounted at an appropriate location on the alternator 202. Although omitted in the drawings, the operator panel 206 is provided with, among others, a main switch used by the operator to turn the generator 200 ON and OFF, a pilot lamp for indicating whether the generator 200 is generating electricity normally, and the aforesaid socket for supplying the output voltage of the generator 200 to the outside. The symbols 208 and 210 respectively designate a fuel tank and a muffler connected to the exhaust pipe of the engine 18.

Figure 13:
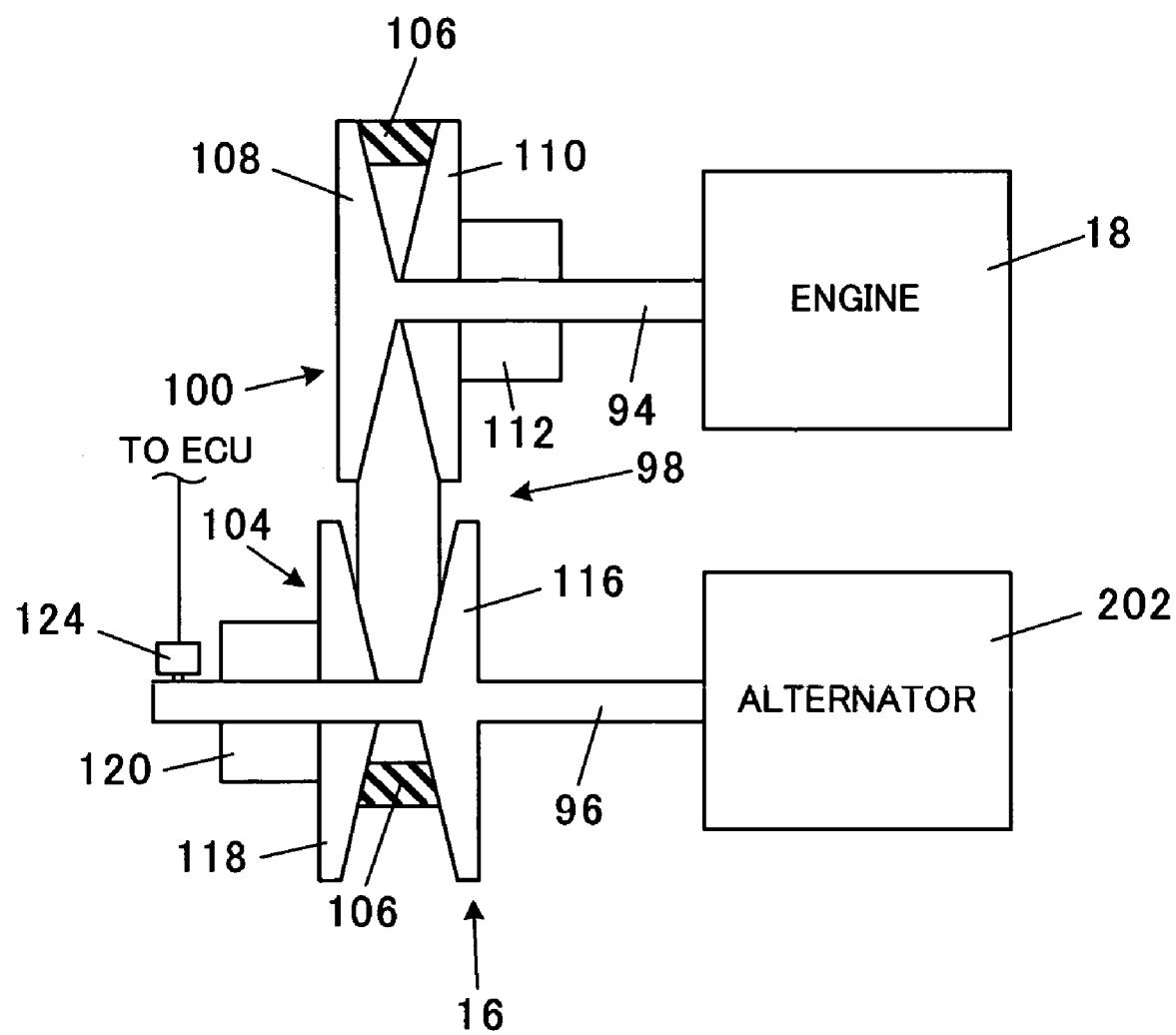
FIG. 13 is an explanatory view schematically showing the structure of a CVT shown in FIG. 11.
Figure 14:
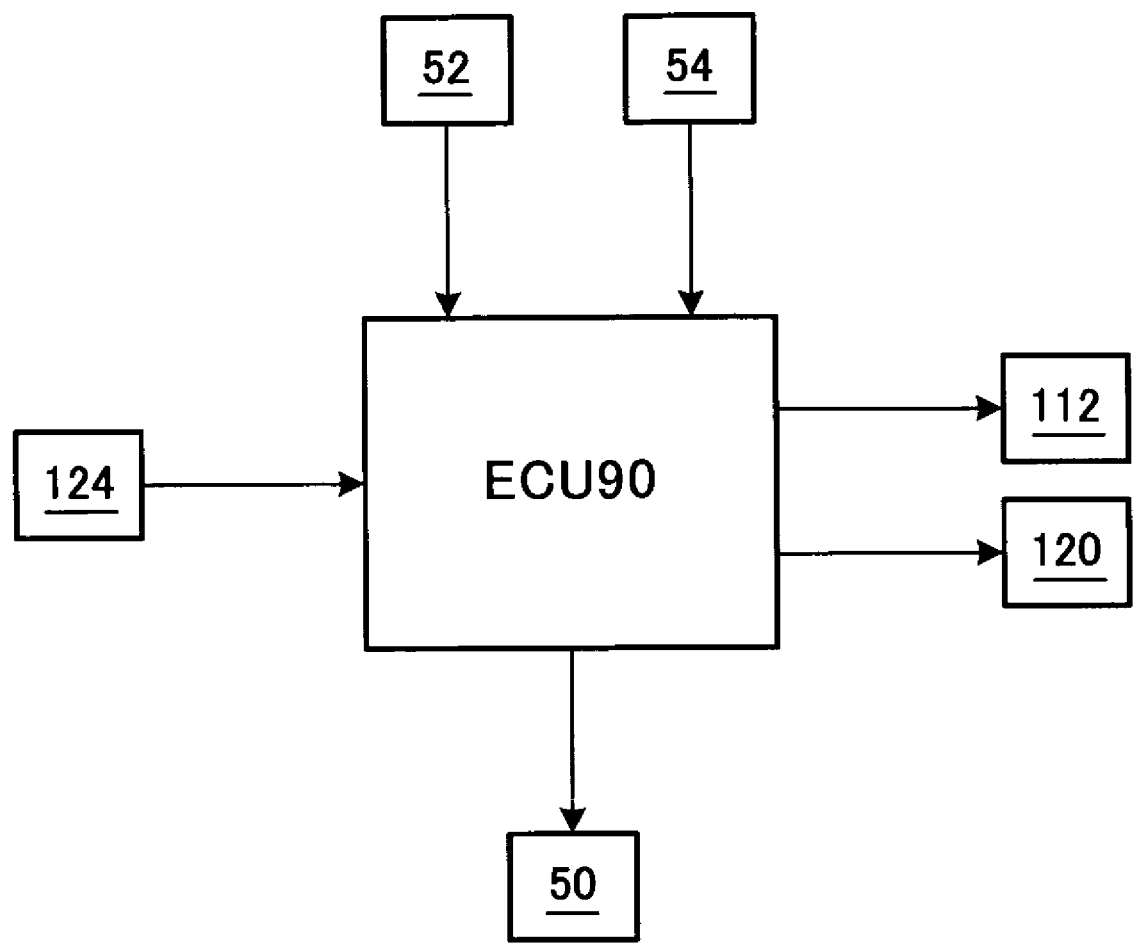
FIG. 14 is a block diagram schematically showing the operation of an ECU shown in FIG. 12.

The structure of the CVT 16 of the second embodiment is illustrated schematically in FIG. 13. FIG. 14 is a block diagram schematically illustrating the operation of the ECU 90 in the second embodiment.

The engine control system according to the second embodiment will be explained with focus on the points of difference from that of the first embodiment. In the second embodiment, the engine 18 powers the generator 200, which is not a machine that travels. The CVT 16 of the engine control system according to the second embodiment is therefore not provided with the drive clutch 56, side clutches 62 and forward/reverse switching mechanism 102 of its counterpart in the first embodiment. The CVT 16 in the second embodiment does not differ from that in the first embodiment in other aspects.

For the same reason, the truck speed regulation lever 84, the speed regulation lever sensor 86 for sensing the position thereof, and the like are also not provided in the second embodiment, so, as shown in FIG. 14, the desired truck speed VD is excluded from the inputs to the ECU 90. The operation of the ECU 90 in the second embodiment does not differ from that in the first embodiments in other aspects. That is, the ECU 90 calculates a current command value for the motor 50 so as to make the detected engine speed NE equal to the desired engine speed NED and outputs the calculated current command value to the motor 50 to control the operation thereof.

Further, the ECU 90 calculates the command values for the hydraulic mechanisms 112, 120 so as to make the output shaft speed NOUT, which is detected by counting the output pulses of the speed sensor 124, equal to the desired output speed NOUTD, based on the detected engine speed NE, namely, the input shaft speed NIN of the CVT 16 and controls or changes the speed reduction ratio r of the CVT 16. In the second embodiment, the desired output speed NOUTD is a fixed value. When the generator 200 is used to generate an output current of a frequency of 60 Hz, it is fixed at 3,600 rpm.

Although not illustrated in the drawings, the ECU 90 turns on the aforesaid pilot lamp and, upon receiving an instruction from the operator via a switch to turn OFF (stop) the generator, complies by cutting off the ignition.

Figure 15:
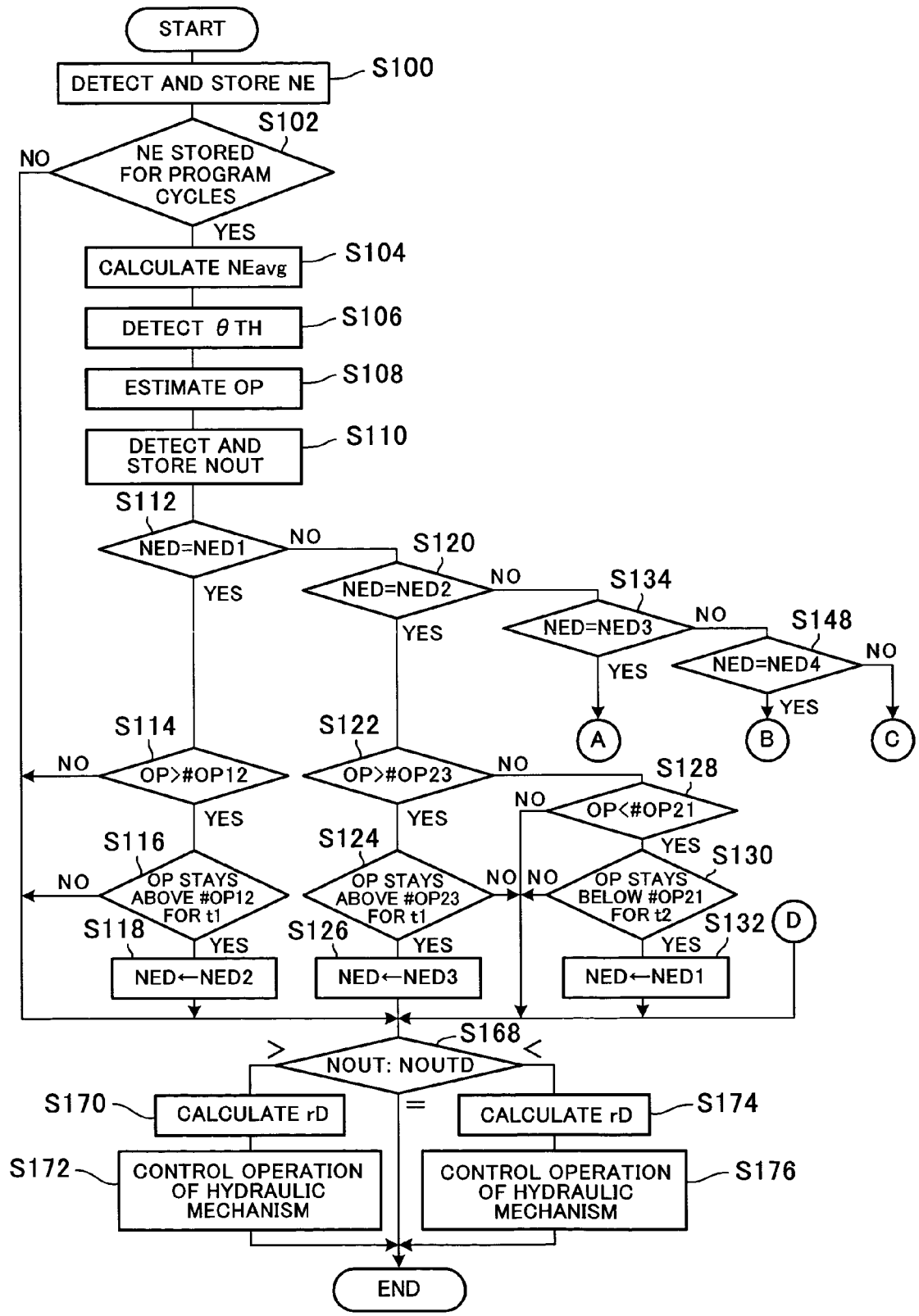
FIG. 15 is a partial flowchart similar to FIG. 6 showing the former half of the processing procedures of the engine control system according to the second embodiment.
Figure 16:
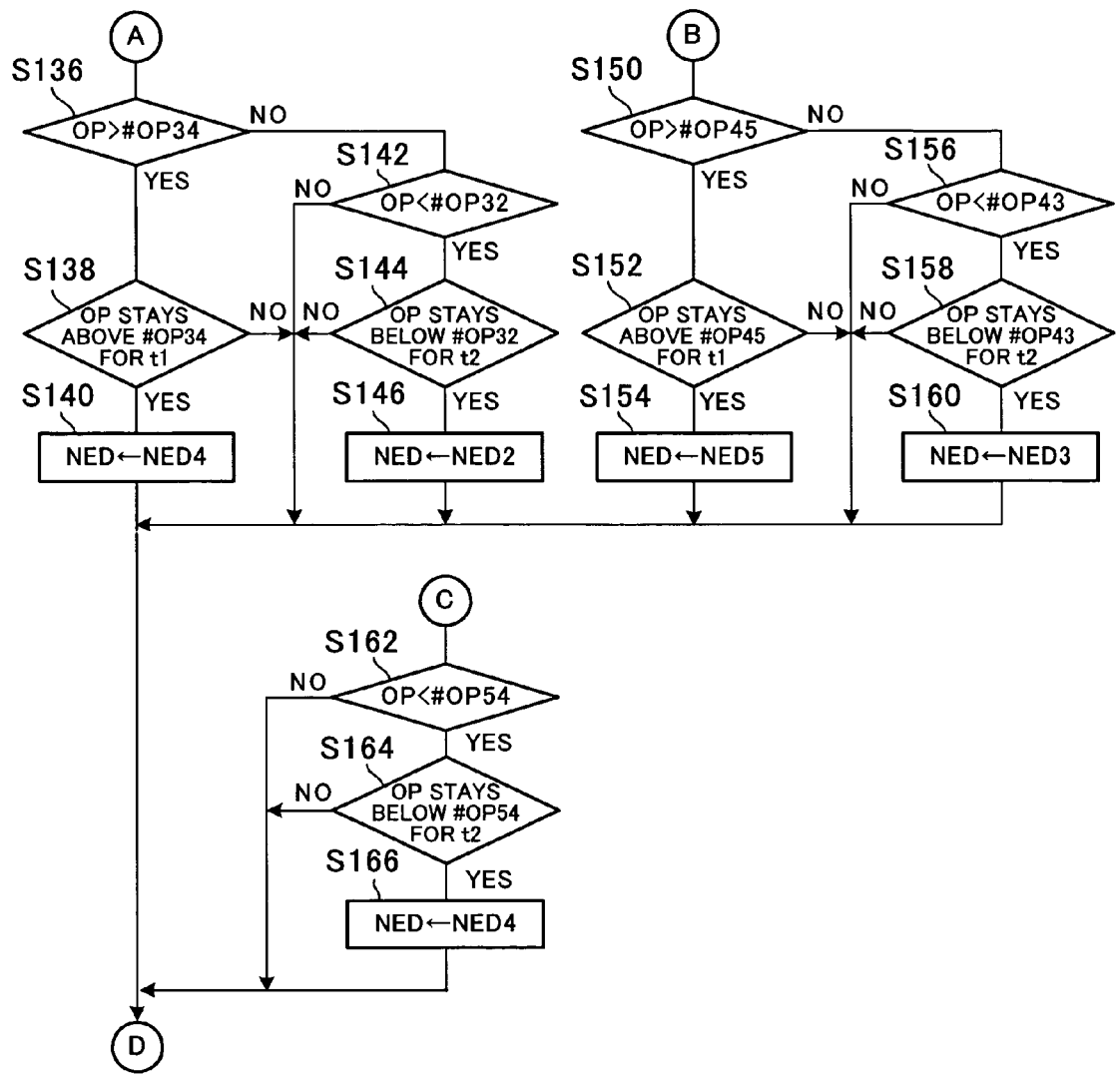
FIG. 16 is a partial flowchart showing the latter half of the flowchart shown in FIG. 15.

FIGS. 15 and 16 are the first and second halves of a flowchart similar to that of FIGS. 6 and 7 for explaining the operation of the engine control system according to the second embodiment. The illustrated program is executed in the ECU 90 once every predetermined time interval (e.g., 20 milliseconds).

The explanation will be made focusing on the points of difference from the engine control system of the first embodiment. The processing of S100 to S106 is carried out in the same manner as that in S10 to S16 of the first embodiment, whereafter the program goes to S108, in which the engine output OP is estimated. As in the first embodiment, the engine output OP is estimated by referring to data mapped empirically beforehand.

When an increase or decrease in the load acting on the alternator 202 (i.e., the load of the engine 18) causes a deviation between the engine speed NE and the desired engine speed NED, the ECU 90 maintains the engine speed NE at the desired engine speed NED by driving the motor 50 to regulate the throttle opening θTH (i.e., regulate the engine output OP). Estimating the engine output OP therefore amounts to estimating the load (the electrical load) acting on the alternator 202.

Next, the processing of S110 to S166 is carried out in the same manner as that in S18 to S78 of the first embodiment, whereafter the program goes to S168, in which the detected output shaft speed NOUT and the desired output speed NOUTD (fixed value) are compared. S22 of the flowchart of FIG. 6 is omitted in the flowchart of the second embodiment because the desired output speed NOUTD is a fixed value in the second embodiment.

When it is found in S168 that the output shaft speed NOUT is greater than the desired output speed NOUTD (e.g., when the value of the desired engine speed NED was changed in the increase direction in S118 or other such step, thereby increasing the engine speed NE and thus increasing the output shaft speed NOUT), the program goes to S170, in which the desired speed reduction ratio rD of the CVT 16 is calculated.

Figure 17:
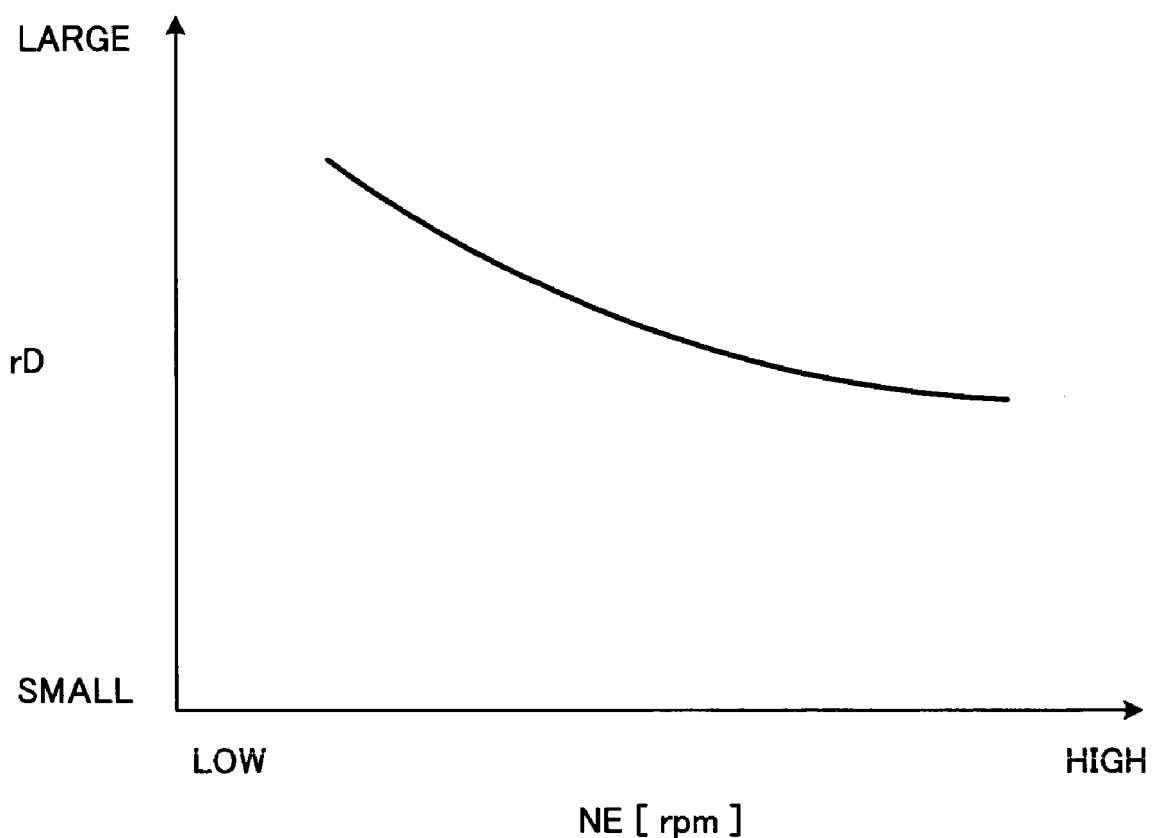
FIG. 17 is a graph showing the characteristics of a desired speed reduction ratio of the CVT with respect to a desired engine speed, which is used in the processing procedures shown in FIG. 15.

The calculation of the desired speed reduction ratio rD is carried out in the same manner as in the first embodiment. However, the second embodiment does not involve setting of a desired truck (vehicle) speed. Therefore, as shown in FIG. 17, only one set of engine speeds NE for making the output shaft speed NOUT equal to the desired output speed NOUTD is empirically mapped with respect to the desired speed reduction ratio rD. In the processing of S170, the calculation or determination of the desired speed reduction ratio rD is performed by retrieval using the detected engine speed NE (more exactly, the average engine speed NEavg) as address data.

Next, in S172, the operation of the hydraulic mechanisms 112, 120 is controlled to make or change the speed reduction ratio r of the CVT 16 equal to the calculated desired speed reduction ratio rD. Therefore, also in the second embodiment, even if the engine speed NE should change or increase in response to load, the output shaft speed NOUT is maintained at the desired output speed NOUTD owing to the change (reduction) of the speed reduction ratio r of the CVT 16.

On the other hand, when it is found in S168 that the output shaft speed NOUT is lower than the desired output speed NOUTD (e.g., when the value of the desired engine speed NED was changed in the speed-decreasing direction in S132 or other such step, thereby decreasing the engine speed NE and thus decreasing the output shaft speed NOUT), the program goes to S174, in which the desired speed reduction ratio rD is increased and then to S176, in which the operation of the hydraulic mechanisms 112, 120 is controlled. Therefore, even if the engine speed NE should change or decrease in response to load, the output shaft speed NOUT is maintained at the desired output speed NOUTD owing to the change of the speed reduction ratio r of the CVT 16 in the increase direction.

When it is found in S168 that the output shaft speed NOUT is equal to the desired output speed NOUTD, the speed reduction ratio r of the CVT 16 does not have to be changed. In this case, therefore, the current speed reduction ratio r is maintained and the program terminated.

The first and second embodiments are thus configured to have a system for controlling operation of an internal combustion engine (18) connected to a machine (walk-behind truck 10; generator 200) through a variable speed reducer (CVT 16) that reduces a speed of the engine to drive the machine, comprising: an actuator (electric motor 50) moving a throttle valve (48) installed in an intake pipe (32) of the engine; a crank angle sensor (54) detecting the speed of the engine NE; an engine speed controller (ECU 90) controlling operation of the actuator such that the detected engine speed NE becomes equal to a desired engine speed NED; a speed sensor (124) detecting a speed of an output shaft (96) of the variable speed reducer (CVT 16); a throttle position sensor (52) detecting an opening of the throttle valve θTH; an engine output estimator (ECU 90, S18, S108) estimating an output of the engine OP based on the detected engine speed and the detected throttle opening; a desired engine speed changer (ECU 90, S26 to S30, S34 to S38, S48 to S52, S62 to S66, S114 to S118, S122 to S126, S136 to S140, S150 to S154) changing the desired engine speed NED to a value in a speed-increasing direction (NEDn) when the estimated engine output OP is determined to be greater than a rising output threshold value (#OP12, #OP23, #OP34, #OP45); and a speed reduction ratio changer (ECU 90, S82 to S88, S170 to S176) changing a speed reduction ratio r of the variable speed reducer based on the detected engine speed such that the detected output shaft speed NOUT becomes equal to a desired output shaft speed NOUTD.

In the system, the desired engine speed changer changes the desired engine speed NED to a value in a speed-decreasing direction NEDn when the estimated engine output OP is determined to be smaller than a falling output threshold value (#OP21, #OP32, #OP43, #OP54) set smaller than the rising output threshold value (#OP12, #OP23, #OP34, #OP45) (ECU 90, S40 to S44, S54 to S58, S68 to S72, S74 to S78, S128 to S132, S142 to S146, S156 to S160, S162 to S166).

In the system, the desired engine speed changer changes the desired engine speed NED to the value in the speed-increasing direction NEDn when the estimated engine output OP is determined to stay above the rising output threshold value for a first predetermined time period (t1) (ECU 90, S26 to S30, S34 to S38, S48 to S52, S62 to S66, S114 to S118, S122 to S126, S136 to S140, S150 to S154).

In the system, the desired engine speed changer changes the desired engine speed NED to the value in the speed-decreasing direction NEDn when the estimated engine output OP is determined to stay below the falling output threshold value for a second predetermined time period (t2) (ECU 90, S40 to S44, S54 to S58, S68 to S72, S74 to S78, S128 to S132, S142 to S146, S156 to S160, S162 to S166).

In the system, the desired engine speed changer changes the desired engine speed NED to the value in the speed-increasing direction NEDn successively when the estimated engine output is determined to be greater than a corresponding one of the rising output threshold values (#OP12, #OP23, #OP34, #OP45).

In the system, the desired engine speed changer changes the desired engine speed NED to the value in the speed-increasing direction NEDn successively when the estimated engine output OP is determined to stay above the corresponding one of the rising output threshold values (#OP12, #OP23, #OP34, #OP45) for a first predetermined time period (t1).

In the system, the desired engine speed changer changes the desired engine speed NED to the value in the speed-decreasing direction NEDn successively when the estimated engine output is determined to be smaller than a corresponding one of the falling output threshold values (#OP21, #OP32, #OP43, #OP54).

In the system, the desired engine speed changer changes the desired engine speed NED to the value in the speed-decreasing direction NEDn successively when the estimated engine output OP is determined to stay below the corresponding one of the falling output threshold values (#OP21, #OP32, #OP43, #OP54) for a second predetermined time period (t2).

In the system, the machine comprises a walk-behind truck (10) including: a bed (12) carrying cargo; driven wheels (60) driven by the reduced speed of the engine; and a lever (truck speed regulation lever 84) enabling an operator to input the desired output shaft speed NOUTD; and the speed reduction ratio changer changes the speed reduction ratio of the variable speed reducer based on the detected engine speed NE such that the detected output shaft speed NOUT becomes equal to the desired output shaft speed NOUTD inputted by the operator.

In the system, the machine comprises a generator (200) having an alternator (202) driven by the reduced speed of the engine.

In the system, the variable speed reducer comprises a continuously variable transmission (CVT 16).

Although the first predetermined time period t1 and second predetermined time period t2 are defined as 1 sec in the first and second embodiments, either or both can set at a different value. Although the desired engine speed NED is divided into five steps in the foregoing embodiments, it can instead be divided into four steps or six steps.

Although specific numerical values are indicated for the desired engine speed NED, first predetermined time periods t1 and t2, engine output OP and the like in the foregoing description, the invention is of course not limited to these values.

Although the engine control system according to the foregoing embodiments is equipped with the CVT (continuously variable transmission) 16, a configuration equipped with a multi-step transmission may be adopted instead.

Although the foregoing embodiments use a stepping motor as the actuator for opening and closing the throttle valve 48, a DC motor, rotary solenoid or any of various other actuators may be used instead.

Although the walk-behind truck 10 according to the first embodiment is propelled by rotating the crawler belts 72, this is not a limitation and it is possible, for example, to adopt a configuration in which the crawler belts 72 are removed and the driveshaft 58 is fitted with tired wheels that are rotated to propel the walk-behind truck 10.

Although the desired output speed NOUTD in the generator of the second embodiment is defined as 3,600 rpm, the desired output speed NOUTD can instead be set at 3,000 rpm (when the frequency of the output current is 50 Hz) or some other appropriate value.

Japanese Patent Application No. 2004-322444 filed on Nov. 5, 2004 and Japanese Patent Application No. 2004-326818 filed on Nov. 10, 2005 are incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling operation of an internal combustion engine connected to a machine through a variable speed reducer that reduces a speed of the engine to drive the machine, comprising:

an actuator moving a throttle valve installed in an intake pipe of the engine;

a crank angle sensor detecting the speed of the engine;

an engine speed controller controlling operation of the actuator such that the detected engine speed becomes equal to a desired engine speed;

a speed sensor detecting a speed of an output shaft of the variable speed reducer;

a throttle position sensor detecting an opening of the throttle valve;

an engine output estimator estimating an output of the engine based on the detected engine speed and the detected throttle opening;

a desired engine speed changer changing the desired engine speed to a value in a speed-increasing direction when the estimated engine output is determined to be greater than a rising output threshold value; and a speed reduction ratio changer changing a speed reduction ratio of the variable speed reducer based on the detected engine speed such that the detected output shaft speed becomes equal to a desired output shaft speed.

2. The system according to claim 1, wherein the desired engine speed changer changes the desired engine speed to a value in a speed-decreasing direction when the estimated engine output is determined to be smaller than a falling output threshold value set smaller than the rising output threshold value.

3. The system according to claim 1, wherein the desired engine speed changer changes the desired engine speed to the value in the speed-increasing direction when the estimated engine output is determined to stay above the rising output threshold value for a first predetermined time period.

4. The system according to claim 2, wherein the desired engine speed changer changes the desired engine speed to the value in the speed-decreasing direction when the estimated engine output is determined to stay below the falling output threshold value for a second predetermined time period.

5. The system according to claim 1, wherein the desired engine speed changer changes the desired engine speed to the value in the speed-increasing direction successively when the estimated engine output is determined to be greater than a corresponding one of the rising output threshold values.

6. The system according to claim 5, wherein the desired engine speed changer changes the desired engine speed to the value in the speed-increasing direction successively when the estimated engine output is determined to stay above the corresponding one of the rising output threshold values for a first predetermined time period.

7. The system according to claim 2, wherein the desired engine speed changer changes the desired engine speed to the value in the speed-decreasing direction successively when the estimated engine output is determined to be smaller than a corresponding one of the falling output threshold values.

8. The system according to claim 7, wherein the desired engine speed changer changes the desired engine speed to the value in the speed-decreasing direction successively when the estimated engine output is determined to stay below the corresponding one of the falling output threshold values for a second predetermined time period.

9. The system according to claim 1, wherein the machine comprises a walk-behind truck including:
   a bed carrying cargo;
   driven wheels driven by the reduced speed of the engine; and
   a lever enabling an operator to input the desired output shaft speed;
   and the speed reduction ratio changer changes the speed reduction ratio of the variable speed reducer based on the detected engine speed such that the detected output shaft speed becomes equal to the desired output shaft speed inputted by the operator.

10. The system according to claim 1, wherein the machine comprises a generator having an alternator driven by the reduced speed of the engine.

11. The system according to claim 1, wherein the variable speed reducer comprises a continuously variable transmission.

12. A method of controlling operation of an internal combustion engine connected to a machine through a variable speed reducer that reduces a speed of the engine to drive the machine and having an actuator moving a throttle valve installed in an intake pipe of the engine; comprising the steps of:
   detecting the speed of the engine;
   controlling operation of the actuator such that the detected engine speed becomes equal to a desired engine speed;
   detecting a speed of an output shaft of the variable speed reducer;
   detecting an opening of the throttle valve;
   estimating an output of the engine based on the detected engine speed and the detected throttle opening;
   changing the desired engine speed to a value in a speed-increasing direction when the estimated engine output is determined to be greater than a rising output threshold value; and
   changing a speed reduction ratio of the variable speed reducer based on the detected engine speed such that the detected output shaft speed becomes equal to a desired output shaft speed.

13. The method according to claim 12, wherein the step of desired engine speed changing changes the desired engine speed to a value in a speed-decreasing direction when the estimated engine output is determined to be smaller than a falling output threshold value set smaller than the rising output threshold value.

14. The method according to claim 12, wherein the step of desired engine speed changing changes the desired engine speed to the value in the speed-increasing direction when the estimated engine output is determined to stay above the rising output threshold value for a first predetermined time period.

15. The method according to claim 13, wherein the step of desired engine speed changing changes the desired engine speed to the value in the speed-decreasing direction when the estimated engine output is determined to stay below the falling output threshold value for a second predetermined time period.

16. The method according to claim 12, wherein the step of desired engine speed changing changes the desired engine speed to the value in the speed-increasing direction successively when the estimated engine output is determined to be greater than a corresponding one of the rising output threshold values.

17. The method according to claim 16, wherein the step of desired engine speed changing changes the desired engine speed to the value in the speed-increasing direction successively when the estimated engine output is determined to stay above the corresponding one of the rising output threshold values for a first predetermined time period.

18. The method according to claim 13, wherein the step of desired engine speed changing changes the desired engine speed to the value in the speed-decreasing direction successively when the estimated engine output is determined to be smaller than a corresponding one of the falling output threshold values.

19. The method according to claim 18, wherein the step of desired engine speed changing changes the desired engine speed to the value in the speed-decreasing direction successively when the estimated engine output is determined to stay below the corresponding one of the falling output threshold values for a second predetermined time period.

20. The method according to claim 12, wherein the machine comprises a walk-behind truck including:
   a bed carrying cargo;
   driven wheels driven by the reduced speed of the engine; and
   a lever enabling an operator to input the desired output shaft speed;
   and the step of speed reduction ratio changing changes the speed reduction ratio of the variable speed reducer based on the detected engine speed such that the detected output shaft speed becomes equal to the desired output shaft speed inputted by the operator.

21. The method according to claim 12, wherein the machine comprises a generator having an alternator driven by the reduced speed of the engine.

22. The method according to claim 12, wherein the variable speed reducer comprises a continuously variable transmission.

* * * * *